United States Patent
Choi et al.

(10) Patent No.: US 9,384,405 B2
(45) Date of Patent: Jul. 5, 2016

(54) EXTRACTING AND CORRECTING IMAGE DATA OF AN OBJECT FROM AN IMAGE

(71) Applicant: Samsung Electronics Co., Ltd., Gyeonggi-do (KR)

(72) Inventors: Myung-kyu Choi, Gyeonggi-do (KR); Tae-hoon Kang, Gyeonggi-do (KR); Won-seok Song, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 14/730,462

(22) Filed: Jun. 4, 2015

(65) Prior Publication Data

US 2016/0132744 A1 May 12, 2016

(30) Foreign Application Priority Data

Nov. 7, 2014  (KR) .................. 10-2014-0154728

(51) Int. Cl.
*G06K 9/34* (2006.01)
*G06K 9/32* (2006.01)
*G06T 7/00* (2006.01)
*G06T 5/00* (2006.01)
*G06K 9/46* (2006.01)

(52) U.S. Cl.
CPC ............ *G06K 9/3208* (2013.01); *G06K 9/3233* (2013.01); *G06K 9/4604* (2013.01); *G06T 5/006* (2013.01); *G06T 7/0081* (2013.01)

(58) Field of Classification Search
CPC ............. G06K 9/00463; G06K 9/3208; G06T 7/0081; G06T 7/0083; G06T 2207/20144; G06T 2207/10016
See application file for complete search history.

(56) References Cited

U.S. PATENT DOCUMENTS

| 7,129,974 | B2 | 10/2006 | Morichika |
| 7,515,153 | B2* | 4/2009 | Jin .................. G06K 9/0063 345/420 |
| 8,428,335 | B2* | 4/2013 | Ge ..................... G06K 9/342 382/141 |
| 8,666,142 | B2* | 3/2014 | Shkolnik ........... B29C 67/0088 382/154 |
| 8,928,730 | B2* | 1/2015 | Stec .................... G06T 5/006 348/36 |
| 9,122,921 | B2* | 9/2015 | Beato ................... G06T 7/0085 |
| 9,165,405 | B2* | 10/2015 | Meier .................. G06T 15/20 |
| 9,262,807 | B2* | 2/2016 | Stec ..................... G06T 5/006 |
| 2005/0078192 | A1 | 4/2005 | Sakurai et al. |
| 2005/0078200 | A1 | 4/2005 | Morichika |

(Continued)

FOREIGN PATENT DOCUMENTS

| JP | 2002-142084 A | 5/2002 |
| JP | 2013-168119 A | 8/2013 |
| KR | 10-2005-0036744 A | 4/2005 |
| KR | 10-2006-0033973 A | 4/2006 |

*Primary Examiner* — Amir Alavi
(74) *Attorney, Agent, or Firm* — Cha & Reiter, LLC.

(57) ABSTRACT

A method and apparatus for processing an image are provided. A processor is configured to detect a region of at least one object from the image, define a plurality of straight lines approximating a boundary of the detected region of the at least one object, and based on the number of points at which each of the plurality of first straight lines coincide with the boundary, extract first image data for a polygonal region. The polygonal region has vertexes at a plurality of first intersection points at which the plurality of straight lines intersect each other. Second image data may be generated by correcting distortion of the first image data. A storage unit stores the second image data, which may also be displayed or transmitted.

33 Claims, 33 Drawing Sheets

(56) References Cited

U.S. PATENT DOCUMENTS

2006/0210192 A1* 9/2006 Orhun ................... G06K 9/32
                                                    382/275
2011/0032570 A1   2/2011  Imaizumi et al.
2011/0285873 A1  11/2011  Showering
2014/0362248 A1  12/2014  Ishida

* cited by examiner

EXTRACTING AND CORRECTING IMAGE DATA OF AN OBJECT FROM AN IMAGE

CLAIM OF PRIORITY

This application claims the benefit of Korean Patent Application No. 10-2014-0154728, filed on Nov. 7, 2014, in the Korean Intellectual Property Office, the disclosure of which is incorporated herein in its entirety by reference.

BACKGROUND

1. Field

The present disclosure relates generally to an image processing method of extracting image data of an object from an image, and correcting the extracted image data, and an apparatus for performing the method.

2. Description of the Related Art

According to developments in image-capture technology, techniques for capturing an image of an object and storing a file of the captured image in storage media have become widespread. One technique has an effect of correcting a tilt of an object within an image. This allows an extracted image to be displayed on a display as if the extracted image is viewed from a point vertically above the object. The method renders an image of an object extracted from a perspective image by converting it into an image for a non-perspective plane.

A document may be also converted into digital data by using a scanner and the converted digital data may be stored, but the scanner is a large, generally non-portable apparatus. Accordingly, without using the scanner, digital data similar to data scanned by the scanner may be generated by capturing an image of a document by using a mobile device, which can capture images, and processing the captured image. However, in a process of separating only an object from a background of an image and extracting the separated object, inaccuracies arise. That is, accurately extracting the boundary of the object is a challenge in a case where the form of the object deviates from a rectangle. For instance, if the form is generally rectangular but a portion of the object is damaged or one or more vertices of the object does not lie at an intersection of two major sides (such as when a corner is cut out), accurate object separation becomes difficult.

SUMMARY

One or more exemplary embodiments include an apparatus and method for accurately extracting an object from an image including the object even though the object has the form of an incomplete tetragon, converting the form of the extracted object into an image corresponding to a rectangle, and storing the image for subsequent display/transmission.

Additional aspects will be set forth in part in the description which follows. According to one or more exemplary embodiments, an apparatus for processing an image including at least one object includes: a processor configured to: detect a region of the at least one object from the image; define a plurality of straight lines approximating a boundary of the detected region, based on a number of distributed points at which each of the plurality of straight lines coincide with the boundary of the detected region; extract first image data for a polygonal region enclosed by at least some of the straight lines (e.g., four in the case of a rectangle), and having vertexes at intersection points at which the at least some of the straight lines intersect each other and; output the extracted first image data as second image data for display; and a storage unit configured to store the second image data.

The second image data may be distortion corrected prior to being output for display and storage. The at least some of the straight lines may correspond to edges of the polygonal region, and the processor may select each of these straight lines as a line having the highest number of distributed points on one side boundary of the object.

The processor may set a first region around each of the plurality of first intersection points, quantize a pixel value of image data of the first region, and correct a first intersection point of the first region on quantized image data of the first region with respect to an outermost vertex determined based on a center of the at least one object.

The processor may extract first image data of a region corresponding to a polygon having a plurality of corrected first intersection points as vertexes and generate second image data by correcting distortion of the extracted first image data.

The processor may detect a region of each of a plurality of objects when the plurality of objects are in the image, may define a plurality of straight lines approximating a boundary of the region of each of the plurality of objects, based on a number of points at which each of the plurality of straight lines coincides with the boundary of the region of each of the plurality of objects, may extract a plurality of pieces of first image data for a polygonal region having a plurality of first intersection points, at which the plurality of first straight lines intersect each other, as vertexes, and may generate a plurality of pieces of second image data by correcting distortion of the plurality of pieces of first image data extracted to correspond to the region of each of the plurality of objects.

The processor may generate separate files including respectively the generated plurality of pieces of second image data and store the separate files in the storage unit.

The processor may generate a single file including image data corresponding to the generated plurality of pieces of second image data and store the single file in the storage unit.

The processor may generate second image data by extracting first image data corresponding to the largest polygonal region from among the plurality of pieces of first image data and correcting distortion of the extracted first image data and store the second image data in the storage unit.

The processor may determine types of the detected plurality of objects, may generate a plurality of pieces of second image data by correcting distortion of a plurality of pieces of first image data corresponding to a plurality of objects of a same type when the determined types are the same, may convert the plurality of pieces of second image data into a plurality of pieces of second image data having a same resolution, and may store the plurality of pieces of second image data having the same resolution in the storage unit.

The apparatus may further include a receiver configured to receive an input signal, wherein the processor selects at least one of the plurality of pieces of second image data based on the input signal received through the receiver and stores the selected at least one piece of second image data in the storage unit.

According to one or more exemplary embodiments, an apparatus for processing an image including a plurality of objects includes: a display unit; a processor configured to detect regions of the plurality of objects from the image, define a plurality of straight lines approximating a boundary of each of the regions, based on a number of distributed points at which each of the plurality of straight lines intersects the boundary of each of the regions, display a plurality of first polygons, each of which has a plurality of first intersection points, at which the plurality of straight lines intersect each other, as vertexes, on the display unit, select a second polygon that is at least one of the plurality of first polygons, extract first image data based on the selection, and generate second image data by correcting distortion of the first image data; and a storage unit configured to store the second image data.

The processor may select the second polygon based on at least one selected from the group consisting of a size of the plurality of first polygons, a degree of distortion, a distance from the center of a screen, and a distance from the apparatus for processing the image, may control the display unit so that the second polygon is displayed in a different manner to first polygons other than the second polygon, which are from among the plurality of first polygons, and may extract the first image data with respect to the second polygon.

The apparatus may further include a receiver configured to receive an external input, wherein the processor selects the second polygon based on the external input.

The processor may control the display unit so that only a third polygon corresponding to a first polygon other than the second polygon, which is from among the plurality of first polygons, is displayed, and may extract first image data for the third polygon.

The processor may control the display unit so that the second polygon is displayed in a different manner to the first polygons other than the second polygon.

The processor may control the display unit so that a thumbnail image corresponding to the second image data is displayed.

According to one or more exemplary embodiments, a method of processing an image including at least one object includes: detecting a region of the at least one object from the image; defining a plurality of straight lines approximating a boundary of the detected region of the at least one object, based on a number of distributed points at which each of the plurality of straight lines coincides with the of the detected region of the at least one object; extracting first image data for a polygonal region having a plurality of first intersection points, at which the plurality of first straight lines intersect each other, as vertexes; generating second image data by correcting distortion of the first image data; and storing the second image data.

According to one or more exemplary embodiments, a method of processing an image including a plurality of objects include: detecting regions of the plurality of objects from the image; defining a plurality of straight lines approximating a boundary of each of the regions, based on the number of distributed points at which each of the plurality of straight lines coincides with the boundary of each of the regions; displaying a plurality of first polygons, each of which has a plurality of first intersection points, at which the plurality of straight lines intersect each other, as vertexes; selecting a second polygon that is at least one of the plurality of first polygons; extracting first image data based on the selection; generating second image data by correcting distortion of the first image data; and storing the second image data.

The method may further include selecting the second polygon based on at least one selected from the group consisting of a size of the plurality of first polygons, a degree of distortion, a distance from the center of a screen, and a distance from an apparatus for processing the image, wherein the displaying of the plurality of first polygons includes displaying the second polygon in a different manner to the first polygons other than the second polygon, and the extracting of the first image data may include extracting the first image data with respect to the second polygon.

The method may further include receiving an external input, wherein the selecting of the second polygon include selecting the second polygon based on the external input.

The method may further include displaying only a third polygon corresponding to a first polygon other than the second polygon, from among the plurality of first polygons, wherein the extracting of the first image data includes extracting first image data for the third polygon.

The displaying of the second polygon may include displaying the second polygon in a different manner than the first polygons other than the second polygon.

The method may further include displaying a thumbnail image corresponding to the second image data.

According to one or more exemplary embodiments, a non-transitory computer readable recording medium having recorded thereon a program for executing the method.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
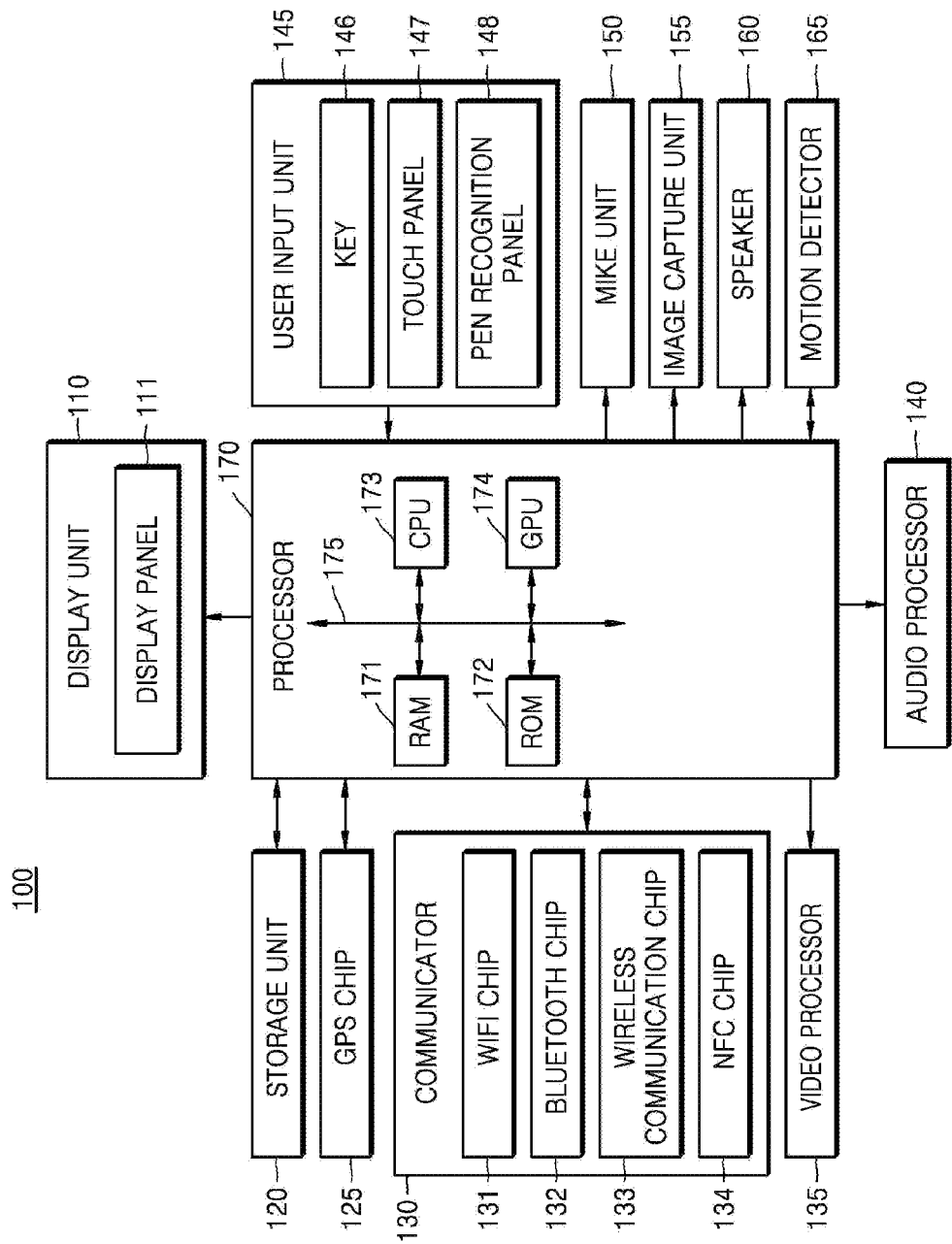
FIG. 1 is a block diagram of an image processing apparatus according to an exemplary embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

The terms used in this specification are those general terms currently widely used in the art in consideration of functions in regard to the exemplary embodiments, but the terms may vary according to the intention of those of ordinary skill in the art, precedents, or new technology in the art. Also, specified terms may be selected by the applicant, and in this case, the detailed meaning thereof will be described in the detailed description of the exemplary embodiments. Thus, the terms used in the specification should be understood not as simple names but based on the meaning of the terms and the overall description of the exemplary embodiments.

When something "comprises" or "includes" a component, another component may be further included unless specified otherwise. Also, terms such as " . . . unit", " . . . module", or the like refer to units that perform at least one function or operation, and the units may be implemented as hardware or software or as a combination of hardware and software. As used herein, the singular forms "a", "an" and "the" are intended to include the plural forms as well, unless the context clearly indicates otherwise.

FIG. 1 is a block diagram of an image processing apparatus 100 according to an exemplary embodiment. The image processing apparatus 100 may include a display unit 110, a processor 170, a storage unit 120, a global positioning system (GPS) chip 125, a communicator 130, a video processor 135, an audio processor 140, a user input unit 145, a mike unit 150, an image capture unit 155, a speaker 160, and a motion detector 165. The display unit 110 may include a display panel 111 and a controller (not shown) for controlling the display panel 111. The display panel 111 may be implemented with one of various types of displays, such as a liquid crystal display (LCD), an organic light-emitting diode (OLED), an active-matrix organic light-emitting diode (AMOLED), and a plasma display panel (PDP). The display panel 111 may be implemented to be flexible, transparent, or wearable. The display unit 110 may be combined with a touch panel 147 of the user input unit 145 to form a touch screen (not shown). For example, the touch screen (not shown) may include an integrated module in which the display panel 111 and the touch panel 147 are integrated as a stack structure.

The storage unit 120 may include an internal memory (not shown) and/or an external memory (not shown).

When included, the internal memory may include a volatile memory (e.g., dynamic random access memory (DRAM), static RAM (SRAM), or synchronous dynamic RAM (SDRAM)), a nonvolatile memory (e.g., one time programmable read only memory (OTPROM), programmable ROM (PROM), erasable and programmable ROM (EPROM), electrically erasable and programmable ROM (EEPROM), mask ROM, or flash ROM), a hard disk drive (HDD), and/or a solid state drive (SSD). According to an exemplary embodiment, the processor 170 may load a command or data, received from at least one selected from a nonvolatile memory and another element, to a volatile memory. Also, the processor 170 may store data received or generated from another element in the nonvolatile memory.

When included, the external memory may include compact flash (CF), secure digital (SD), micro secure digital (Micro-SD), mini secure digital (Mini-SD), extreme digital (xD), and/or a memory stick.

The storage unit 120 may store various programs and data which are used for an operation of the image processing apparatus 100. For example, the storage unit 120 may temporally or semi-permanently store at least some of contents to be displayed on a lock screen.

The processor 170 may control the display unit 110 so that some of contents stored in the storage unit 120 are displayed on the display unit 110. In other words, the processor 170 may display some of contents stored in the storage unit 120 on the display unit 110. The processor 170 may execute the image processing for extraction and correction operations described hereinafter.

The processor 170 may include at least one selected from a RAM 171, a ROM 172, a central processing unit (CPU) 173, a graphic processing unit (GPU) 174, and a bus 175. The RAM 171, the ROM 172, the CPU 173, and the GPU 174 may be connected to one another via the bus 175.

The CPU 173 accesses the storage unit 120 and performs a booting operation by using an operating system (OS) stored in the storage unit 120. Also, the CPU 173 performs various operations by using various programs, contents, and data, stored in the storage unit 120.

A command set for booting a system is stored in the ROM 172. When a turn-on command is input and thus a power supply voltage is supplied to the image processing apparatus 100, the CPU 173 may copy the OS stored in the storage unit 120 into the RAM 171 according to a command stored in the ROM 172 and may execute the OS to boot the system. When the booting is completed, the CPU 173 copies various programs stored in the storage unit 120 into the RAM 171 and executes the programs copied into the RAM 171 to perform various operations. When the booting of the image processing apparatus 100 is completed, the GPU 174 displays a user interface (UI) screen on a region of the display unit 110. Specifically, the GPU 174 may generate a screen on which an electronic document including various objects, such as contents, icons, and menus, is displayed. The GPU 174 calculates attribute values, such as coordinates on which each object will be displayed, and the form, size, and color of each object, according to a layout of the screen. Also, the GPU 174 may generate screens having various layouts including objects, based on the calculated attribute values. The screens generated by the GPU 174 may be provided to the display unit 110 and be respectively displayed on regions of the display unit 110.

The GPS chip 125 may receive a GPS signal from a GPS satellite and calculate a current location of the image processing apparatus 100. The processor 170 may calculate a user location by using the GPS chip 125 when using a navigation program or when a current location of a user is required.

The communicator 130 may perform communication with various types of external devices according to various types of communication methods. The communicator 130 may include at least one selected from a WiFi chip 131, a Bluetooth chip 132, a wireless communication chip 133, and a near field communication (NFC) chip 134. The processor 170 may perform communication with various external devices by using the communicator 130.

The WiFi chip 131 may perform communication by using a WiFi method, and the Bluetooth chip 132 may perform communication by using a Bluetooth method. In the case of using the WiFi chip 131 or the Bluetooth chip 132, various pieces of connection information, such as system identification (SSID) and session keys, may be first transmitted and received and then various pieces of information may be transmitted and received after a communication connection is performed by using the connection information. The wireless communication chip 133 is a chip that performs communication according to various communication standards, such as institute of electrical and electronic engineers (IEEE), Zigbee, 3rd generation (3G), 3rd generation partnership project (3GPP), and long term evolution (LTE) standards. The NFC chip 134 is a chip that operates in an NFC method using a frequency band of 13.56 MHz selected from among various radio frequency identification (RFID) frequency bands, such as 135 kHz, 13.56 MHz, 433 MHz, 860 MHz to 960 MHz, and 2.45 GHz.

The video processor 135 may process video data included in contents received through the communicator 130 or contents stored in the storage unit 120. The video processor 135 may perform image processing, such as decoding, scaling, noise filtering, frame rate conversion, and resolution conversion, with respect to video data.

The audio processor 140 may process audio data included in contents received through the communicator 130 or contents stored in the storage unit 120. The audio processor 140 may perform audio processing, such as decoding, amplifying, and noise filtering, with respect to audio data.

When a reproduction program for multimedia contents is executed, the processor 170 may drive the video processor 135 and the audio processor 140 to reproduce the multimedia contents. The speaker 160 may output audio data generated by the audio processor 140.

The user input unit 145 may receive various commands from a user. The user input unit 145 may include at least one selected from a key 146, a touch panel 147, and a pen recognition panel 148.

The key 146 may include various types of keys, such as a mechanical button and a wheel, formed in various regions, such as a front part, a side part, and a rear part of a body of the image processing apparatus 100.

The touch panel 147 may sense a touch input of a user and output a touch event value corresponding to the sensed touch input. When a touch screen (not shown) is formed by a combination of the touch panel 147 and the display unit 110, the touch screen may be implemented with various types of touch sensors, such as a touch sensor using a capacitive method, a touch sensor using a resistive method, and a touch sensor using a piezoelectric method. The capacitive method is a method of sensing, by using a dielectric coated on the surface of a touch screen, a very small amount of electricity, which is induced into a user's body when a portion of the user's body is touched on the surface of the touch screen, and calculating touch coordinates based on the sensed small amount of electricity. The resistive method, which uses two electrode plates built in a touch screen, is a method of sensing a current, which occurs due to contact between the two electrode plates at a touched point when a user touches a touch screen, and calculating touch coordinates based on the sensed current. A touch event occurring on a touch screen may be mainly generated by a user's finger, but may also be generated by an object formed of a conductive material, which may apply a capacitance change to the touch screen.

The pen recognition panel 148 may sense a proximity input or touch input by a touch pen (e.g., a stylus pen or a digitizer pen), according to an operation of the touch pen, and may output a pen proximity event or pen touch event based on the sensed proximity input or touch input. The pen recognition panel 148 may be implemented by using an electro-magnetic resonance (EMR) effect and may sense a touch or proximity input according to a change in the intensity of an electromagnetic field which is caused by the proximity or touch of a pen. In detail, the pen recognition panel 148 may include an electromagnetic induction coil sensor (not shown) having a grid structure and an electronic signal processor (not shown) providing an alternating current (AC) signal having a predetermined frequency to loop coils of the electromagnetic induction coil sensor. When a pen embedded with a resonant circuit is placed around a loop coil of the pen recognition panel 148, a current based on mutual electromagnetic induction is generated in the resonant circuit of the pen due to a magnetic field that is transmitted from the loop coil. Based on the current, an induction field occurs in a coil of the resonant circuit of the pen, and the pen recognition panel 148 detects the induction field from the loop coil that is in a signal reception state, to sense a proximity position or touch position of the pen. The pen recognition panel 148 may have a certain area under the display panel 111, for example, an area that may cover a display region of the display panel 111.

The mike unit 150 may receive a user's voice and other sounds and convert the received user's voice and sounds into audio data. The processor 170 may use, in a telephone call operation, a user's voice input through the mike unit 150 or may convert the user's voice into audio data and store the audio data in the storage unit 120.

The image capture unit 155 may capture a still image or a moving image according to the control of a user. The image capture unit 155 may be implemented with a plurality of cameras, such as a front camera and a rear camera. An image captured by the image capture unit 155 may include one or more objects for which extraction and correction processing described hereafter with respect to FIGS. 3-33 may be performed by processor 170.

When the image capture unit 155 and the mike unit 150 are disposed, the processor 170 may perform a control operation according to a user's voice input through the mike unit 150 or a user's motion recognized by the image capture unit 155. For example, the image processing apparatus 100 may operate a motion control mode or a voice control mode. When the image processing apparatus 100 operates in the motion control mode, the processor 170 may activate the image capture unit 155 to capture a user image and may trace a change in a user's motion and perform a control operation corresponding to the traced change. When the image processing apparatus 100 operates in the voice control mode, the processor 170 may analyze a user's voice input through the mike unit 150 and operate in a voice recognition mode for performing a control operation according to the analyzed user voice.

The motion detector 165 may detect a body motion of the image processing apparatus 100. The image processing apparatus 100 may be rotated or inclined in various directions. In this case, the motion detector 165 may detect motion characteristics, such as a rotation direction, an angle, and an inclination, by using at least one of various sensors, such as a geomagnetic sensor, a gyro sensor, and an acceleration sensor.

Figure 2:
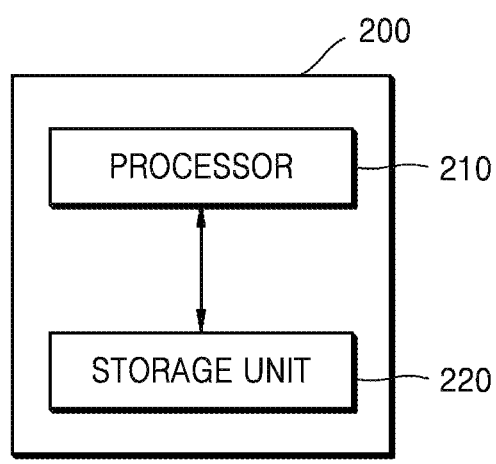
FIG. 2 is a block diagram illustrating a relation between elements of an image processing apparatus, according to an exemplary embodiment.

FIG. 2 is a block diagram illustrating a relation between elements of an image processing apparatus 200, according to an exemplary embodiment.

The image processing apparatus 200 may correspond to the image processing apparatus 100 illustrated in FIG. 1.

A processor 210 of the image processing apparatus 200 may implement operations described in connection with FIGS. 3 to 33 hereafter. To this end, the processor 210 may extract a region of an object in a captured image, detect intersection points of a plurality of straight lines defined to approximate the boundary of the extracted region, and extract first image data corresponding to the region of the object based on the intersection points. The captured image may be an image input through the image capture unit 150, an image received from the an external source through the communicator 130, or an image stored in the storage unit 120. However, the inventive concept is not limited thereto. The processor 210 may correspond to the processor 170 illustrated in FIG. 1. The processor 210 may generate second image data having a rectangular form by correcting distortion of the first image data, and the second image data may be stored in a storage unit 220 and displayed. This process is described in more detail below.

Figure 3:
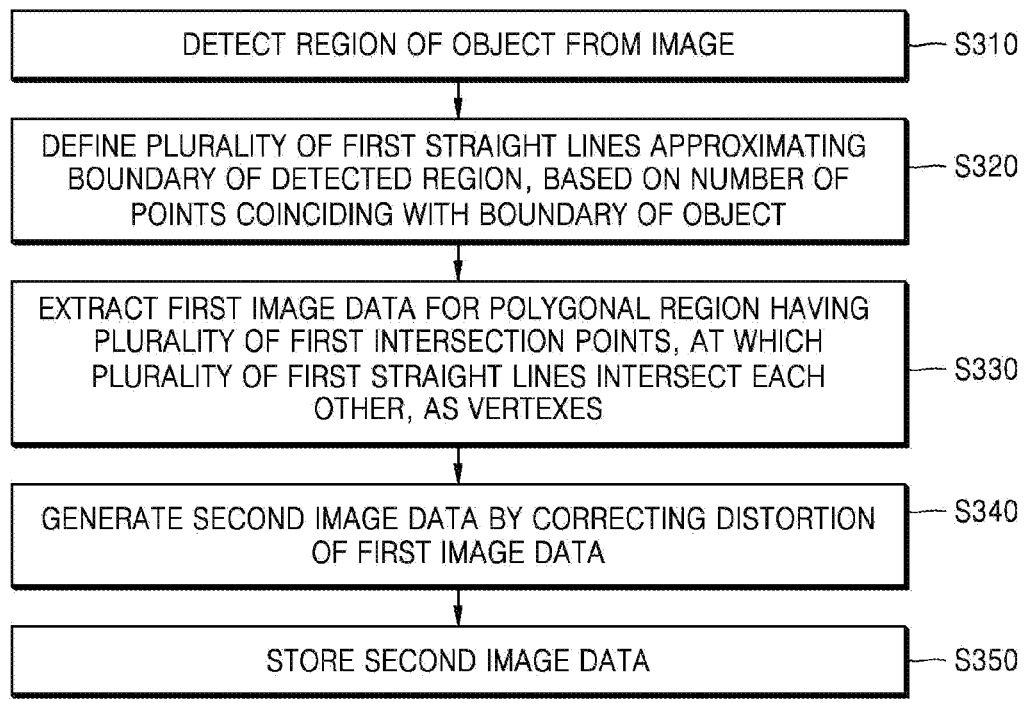
FIG. 3 is a flowchart of a method of processing an image including an object, according to an exemplary embodiment.

FIG. 3 is a flowchart of a method of processing an image including an object, according to an exemplary embodiment.

Figure 4:
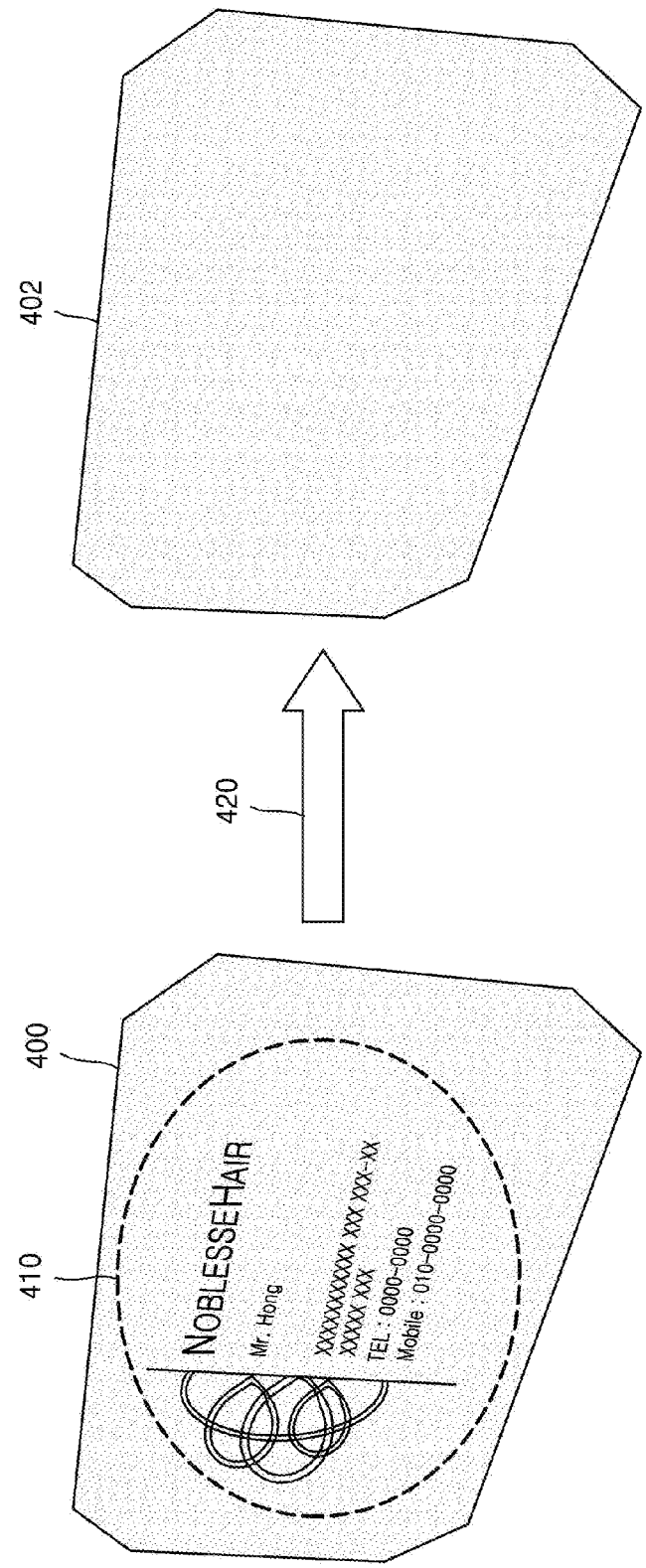
FIG. 4 illustrates a process of defining a region of an object to generate image data, according to an exemplary embodiment.

In operation S310, the image processing apparatus 200 detects a region of the object from the image. For example, when a business card is photographed by using the image processing apparatus 200, the image processing apparatus 200 detects a region corresponding to the business card from the captured image. A segmentation technique may be used as a method of detecting the region of the object, and specifically, a color-based segmentation technique may be used as the method of detecting the region of the object. However, the inventive concept is not limited thereto. FIG. 4 illustrates an example process of detecting the region of the object (by detecting its boundary within the overall image), which is performed in operation S310. The region of the object is detected by detecting the boundary of the object within a larger rectangular or square region (not shown) of the image, e.g., a photographed image of an image of a supplied image file. In this example, the image processing apparatus 200 may segment an object 400 from the larger image to detect the object 400 (operation 420). (A data area 410 may also exist within the object 400.) A technique of segmenting the object 400 may be a color-based segmentation technique, but is not limited thereto. The region 402 of the object 400 may be detected by performing color-based segmentation for the object 400.

In operation S320, the image processing apparatus 200 defines a plurality of straight lines, hereafter referred to as "first" straight lines, approximating the boundary of the region of the object detected in operation S310. The straight lines are determined based on an analysis of points along the boundary (described and illustrated later). For example, when the detected region of the object has the general form of a tetragon, the plurality of first straight lines may be defined as a plurality of straight lines (four straight lines) corresponding to the four sides of the tetragon.

Figure 5:
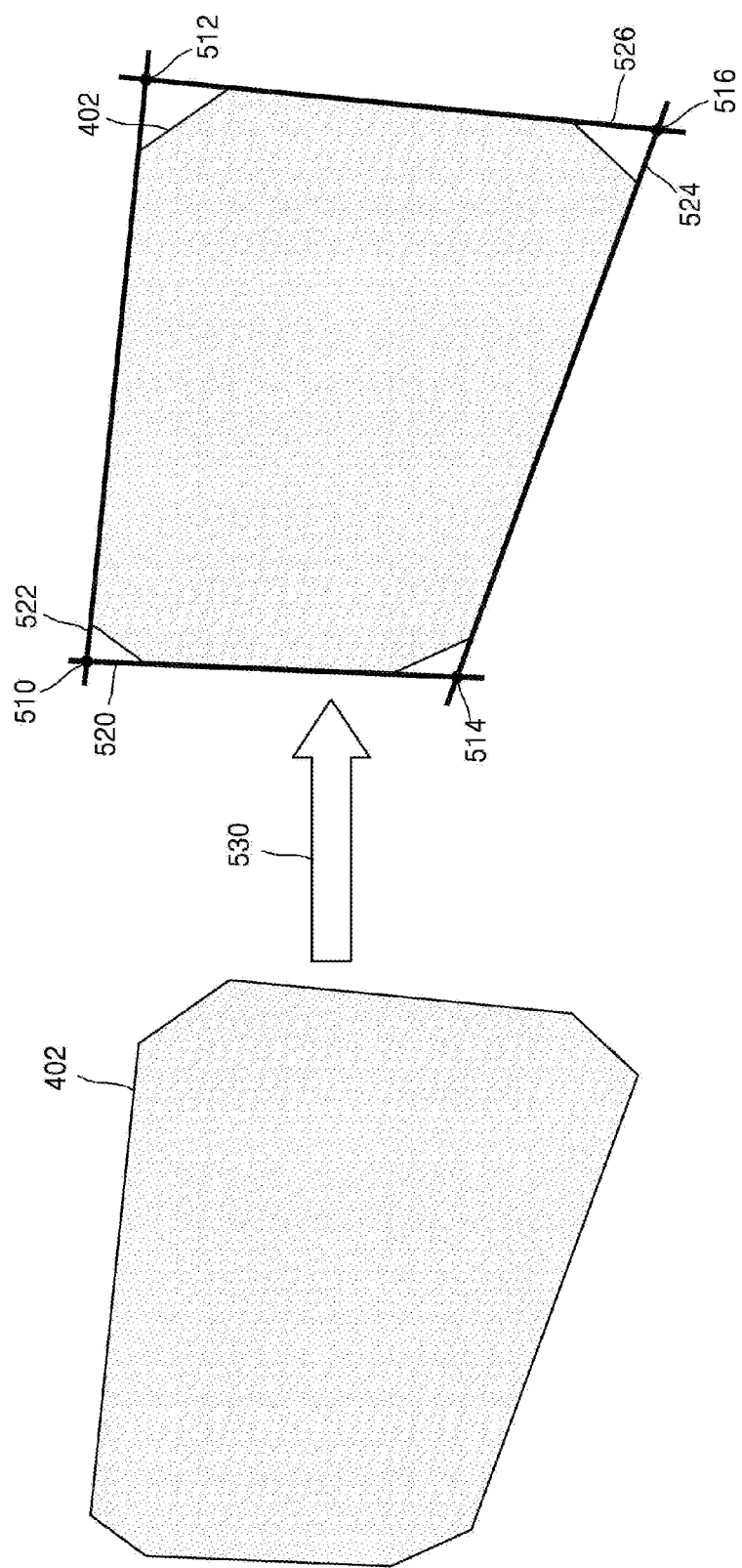
FIG. 5 illustrates a process of defining straight lines for forming a region of an object detected to generate image data, and detecting intersection points of the straight lines, according to an exemplary embodiment.

FIG. 5 illustrates a process of defining the plurality of first straight lines approximating the boundary of the region detected in operation S320. As shown in FIG. 5, when the region 402 of the object 400, detected by the color-based segmentation technique in operation S310, has a form that is similar to the form of a tetragon, a plurality of first straight lines 520, 522, 524, and 526 may be defined to approximate the sides of a tetragonal form that is similar to the region 402 of the object 400 (operation 530).

In operation S330, the image processing apparatus 200 may determine a plurality of first intersection points by finding points at which the plurality of first straight lines intersect each other. The determined plurality of first intersection points may be regarded as points corresponding to vertexes of image data to be extracted. Referring to FIG. 5, a plurality of first intersection points 510, 512, 514, and 516, which are points at which the plurality of first straight lines 520, 522, 524, and 526 defined in operation S320 intersect each other, may be determined. A polygon may be generated based on the positions of the plurality of first intersection points 510, 512, 514, and 516, and first image data may be extracted using the generated polygon as a contour line of the first image data. Since the number of first intersection points 510, 512, 514, and 516 is 4, a tetragon having the first intersection points 510, 512, 514, and 516 as vertexes thereof may be generated and the first image data may be extracted using the generated tetragon as a contour line of the first image data.

Figure 6A:
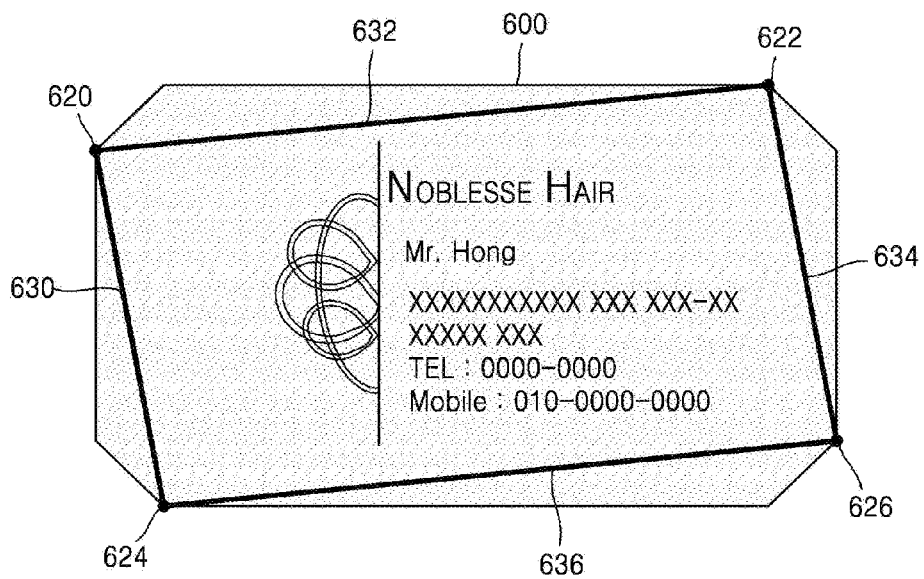
FIG. 6A and FIG. 6B illustrates problems that may occur in a process of detecting an object.
Figure 6B:
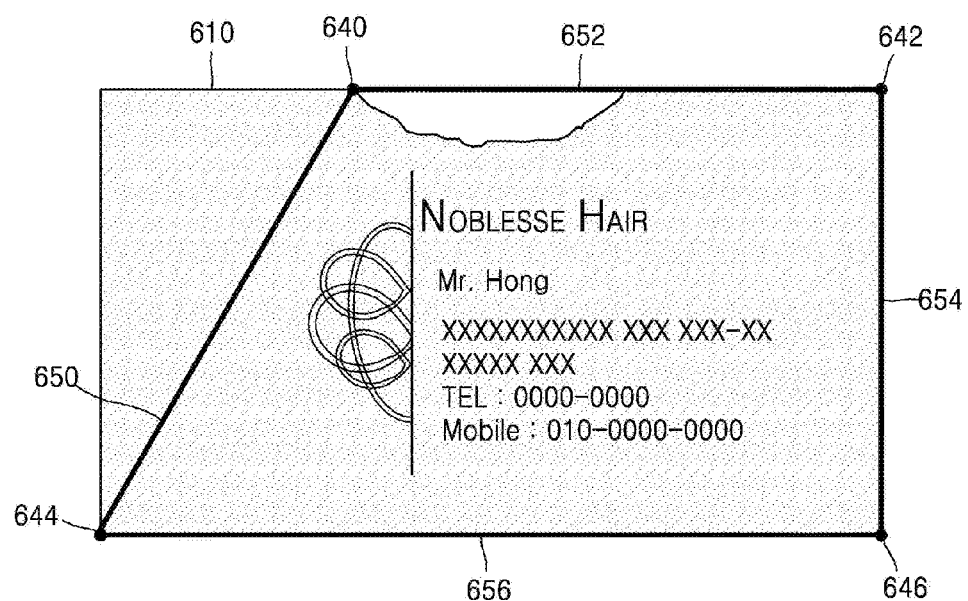

As shown in FIG. 5, with regard to operation S330, the plurality of first intersection points 510, 512, 514, and 516, at which the plurality of first straight lines 520, 522, 524, and 526 approximating the boundary of the region 402 of the object 400 intersect each other, may be determined to be outside the boundary of the region 402 as well as on a contour line coinciding with the boundary of the region 402 (i.e., running along a boundary line). For example, when a region of an object has a non-tetragonal form due to a round vertex portion of the object or damage to a portion of the object, as well as when the region of the object has the form of an A4 page whose vertexes are clear, it is difficult with conventional techniques to generate an image desired by a user if image data corresponding to a polygonal region is generated based on a plurality of points determined on a contour line. In the current exemplary embodiment, since the region of image data is defined by using intersection points of a plurality of first straight lines, the plurality of first intersection points 510, 512, 514, and 516, which correspond to vertexes of image data of a rectangular type, may also be determined to be outside the region of the object. Referring to FIG. 6A with regard to this example, a detected object may be a business card 600, having a form that is similar to a rectangle, but a portion thereof corresponding to a vertex does not have a right-angled form but a round or cut form. Or, as shown in the example of FIG. 6B, a business card 610 may have a form that is rectangular, but a portion thereof is damaged. In these cases, if using a technique of determining a contour line of a region corresponding to a business card and generating image data of a polygonal region having a plurality of points determined on the contour line to be vertexes, it is difficult to extract image data for a region related to the business card because vertexes of the polygonal region are formed on the contour line. For example, five or more vertexes are on the contour of the business card 600, even though the form of the business card 600 is rectangular overall. However, in detecting the business card 600 by using edge-based segmentation and determining image data to be extracted with respect to the business card 600, vertexes are determined on the contour line of the business card 600. Accordingly, in the case of generating image data of a rectangle having four vertexes 620, 622, 624, and 626 determined in this manner, a plurality of straight lines 630, 632, 634, and 636 corresponding to sides of the rectangular image data are not parallel to or perpendicular to main sides (e.g., long sides) of the business card 600. In this case, image data in which the business card 600 is tilted and a part of the business card 600 is not included is extracted. Thus a conventional technique yields an undesirable image extraction in this case (i.e., the region within the bolded border).

Referring to FIG. 6B as another example, there may be a case in which image data to be extracted is determined by detecting the business card 610, having a form that is rectangular, but a portion thereof is damaged, by using edge-based segmentation. In this case, vertexes are determined on a contour line of the business card 610, and thus in the case of generating image data of a rectangle having four vertexes 640, 642, 644, and 646 determined in this manner, a plurality of straight lines 650, 652, 654, and 656 corresponding to sides of the rectangular image data are determined not to be parallel to or perpendicular to main sides (e.g., long sides) of the business card 610. In this case, image data in which the business card 610 is tilted and a part of the business card 610 is not included is extracted conventionally. According to this example, it is difficult for a user using an image processing apparatus to generate a desired image. However, in the current exemplary embodiment, such a result may be prevented since the plurality of first intersection points 510, 512, 514, and 516, at which the plurality of first straight lines 520, 522, 524, and 526 defined in operation S320 intersect each other, may also be determined beyond the periphery of the region 402 of the object, as shown in FIG. 5.

Figure 7:
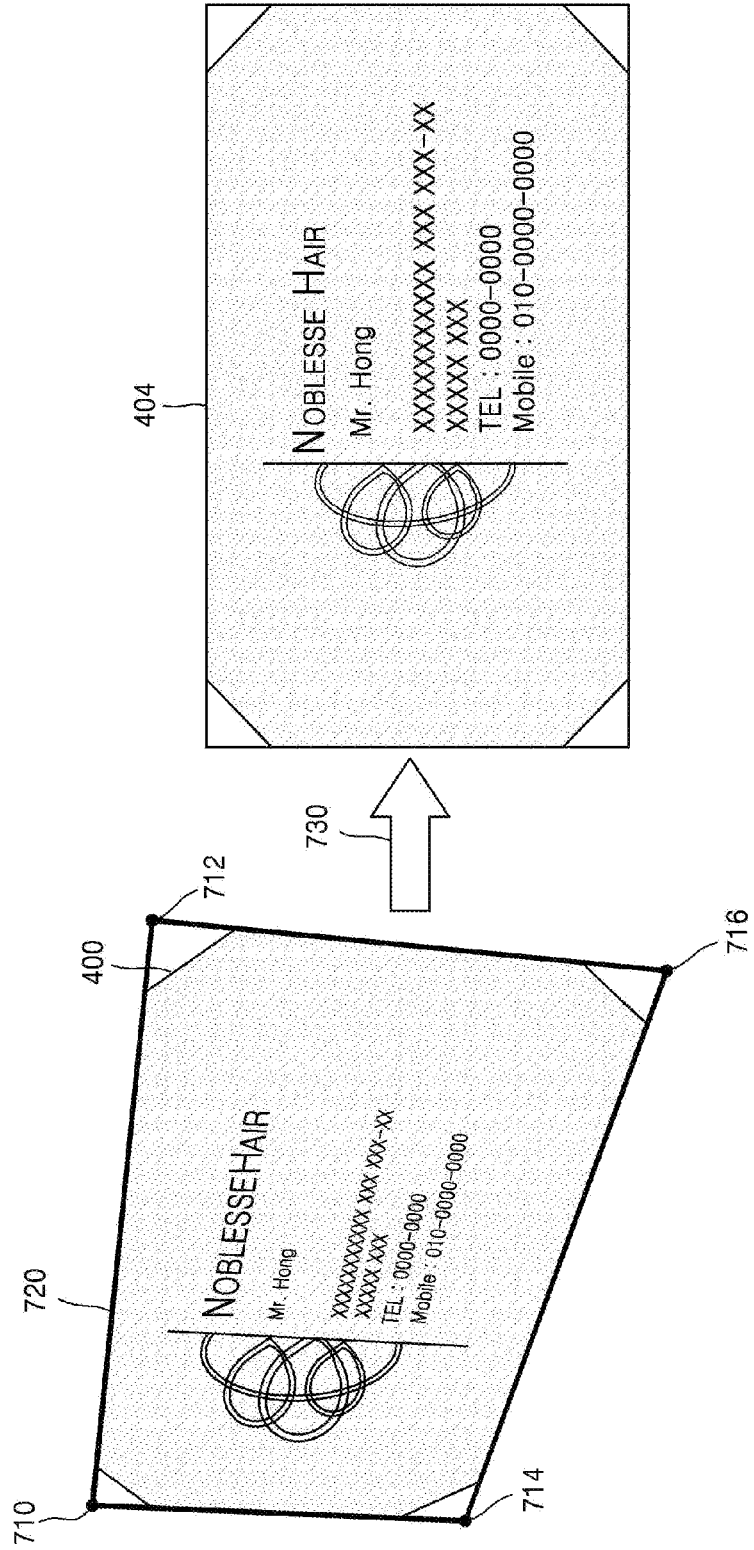
FIG. 7 illustrates a process of generating image data for a region of an object based on vertexes at which a plurality of straight lines intersect each other, according to an exemplary embodiment.

With continuing reference to FIG. 3, in operation S340, the image processing apparatus 200 may generate second image data by correcting the distortion of the first image data extracted in operation S330. Herein, "correcting the distortion" may encompass correcting an irregular boundary of an imaged object so that the image appears with a symmetrical boundary, such as a rectangle. That is, the second image data may be generated through a process of correcting the first image data, which has a polygonal form, for example, a tetragonal form which is non-rectangular form, to have a rectangular form. Such a correction may be performed by using a warping technique after calculating a matrix from the first image data. However, the inventive concept is not limited thereto, as other correction techniques may be employed. Referring to FIG. 7 with regard to operation S340, the first image data extracted in operation S330 may be image data corresponding to a tetragonal region bounded by intersection points 710, 712, 714, and 716, which are vertexes of the tetragonal region. In this case, first image data 720 of a tetragonal region, which includes image data corresponding to an object 400, is extracted, and second image data 404 corresponding to a rectangle is generated when the distortion of the first image data 720 is corrected by using the warping technique (operation 730).

The second image data thus derived from the first image data may be finally output by processor 170 for display on the display unit 110 and/or transmitted to another location as an image file(s) via the communicator 130 for ultimate display elsewhere.

Figure 8:
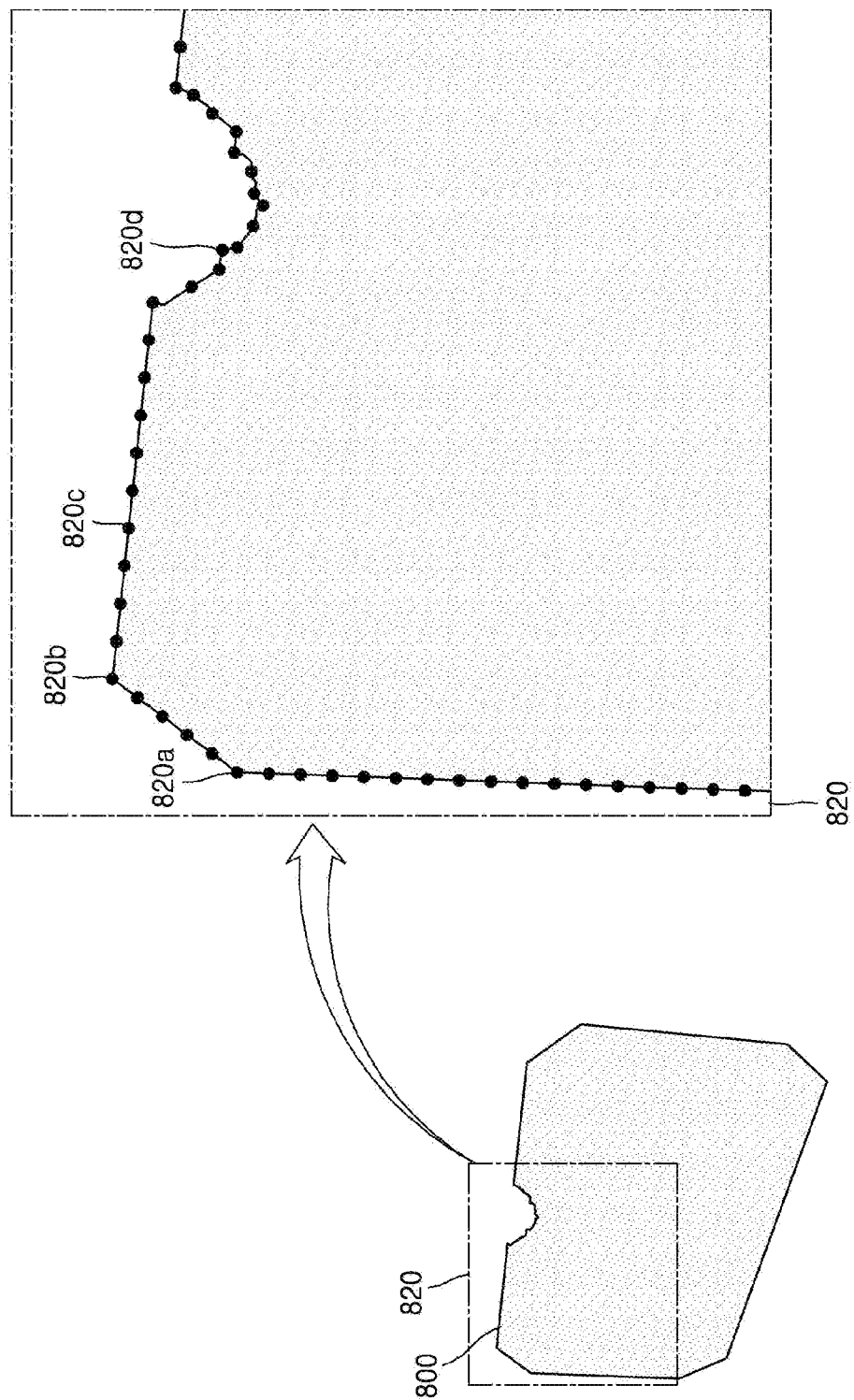
FIG. 8 illustrates points forming a boundary of a region of an object, according to an exemplary embodiment.

FIG. 8 illustrates points forming the boundary of the region of an object 800, according to an exemplary embodiment. Specifically, the boundary of the region of the object 800 to be detected may be approximated by a plurality of distributed points (e.g., evenly spaced). The square region 820 surrounds a corner portion of the object 800. The boundary of the region of the object 800 may include a large number of sample points including a plurality of points 820a, 820b, 820c, and 820d.

Figure 9:
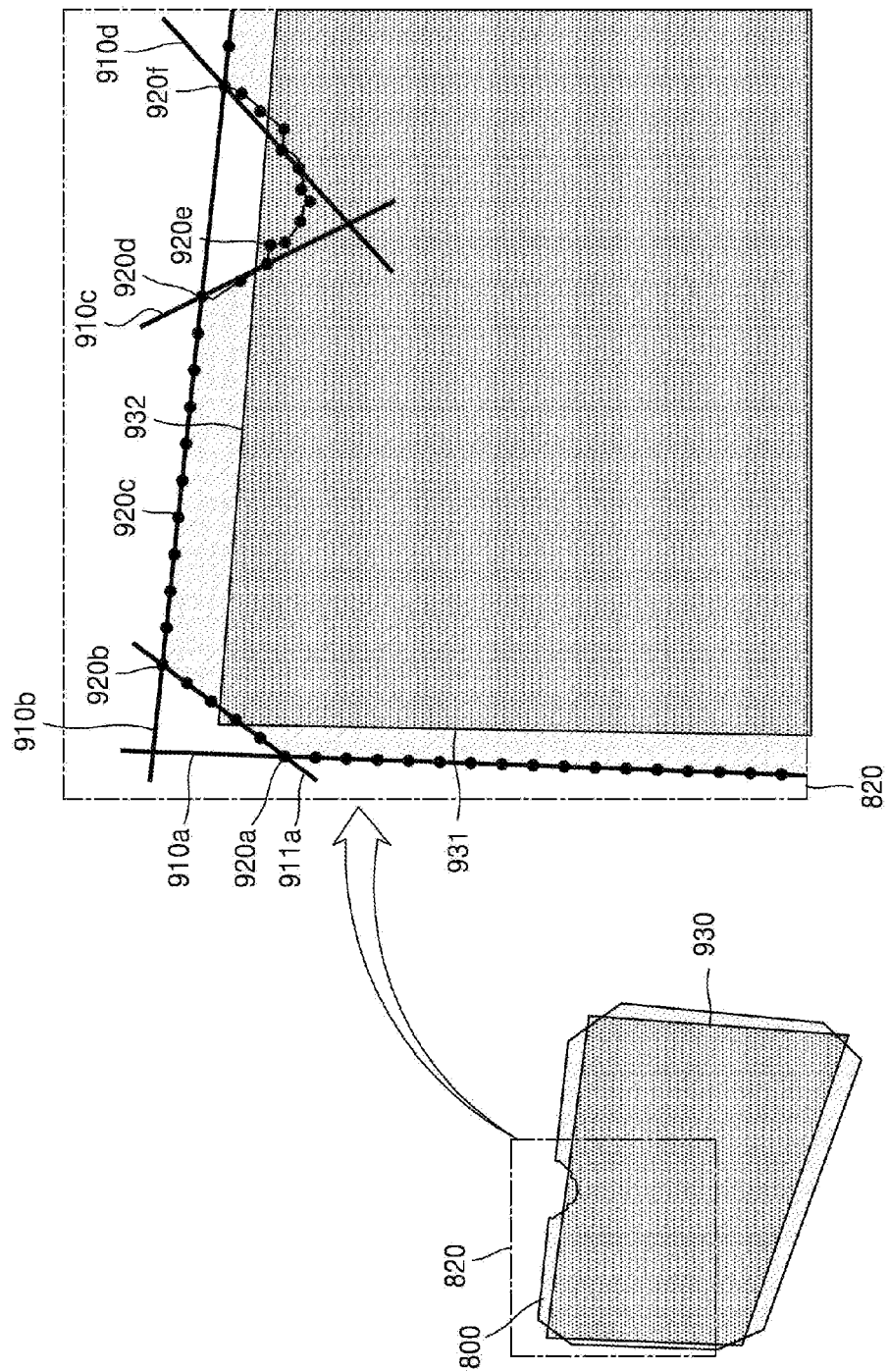
FIG. 9 illustrates first straight lines approximating a boundary of a region of an object, according to an exemplary embodiment.

FIG. 9 illustrates computer-implemented generation of first straight lines approximating the boundary of the region of an object 800, according to an exemplary embodiment. For instance, considering a portion within a sample region 820 surrounding a corner portion of the object 800, the boundary of the region of the object 800 may include a large number of distributed sample points, including a plurality of points 920a, 920b, 920c, 920d, 920e, and 920f. An objective of the technique is to correct the image of a generally rectangular but imperfect object 800 (represented as first data), and thereby realize a rectangular image 930 (represented as second data). (The rectangular image 930 is also broadly referred to herein as a tetragon 930.) A plurality of straight lines 910a, 910b, 910c, and 910d each passing through a plurality of points of the large number of distributed points approximating the boundary of the object 800 may be defined. If it may be determined that a schematic form of a detected region of the object 800 corresponds generally to a tetragonal form, a plurality of first straight lines may be defined based on a determined tetragon 800. A method of determining the tetragon 800 corresponding to the schematic form of the detected region of the object 800 may be a method of determining a tetragon which mostly overlaps the detected region. However, the inventive concept is not limited thereto. A first straight line approximating one of the sides of the tetragon 930 may be defined as one of a plurality of straight lines which coincides with (runs along) the boundary of the object 800, at the largest number of points. Also, since the tetragon 930 to be formed may have sides that are slightly longer or shorter than corresponding sides of the object 800, each side of tetragon 930 may be adjacent to, but not overlaying, a corresponding side of object 800.

For example, a first straight line corresponding to the left side 931 of the tetragon 930 may be defined as a straight line 910a that runs along (coincides with) the boundary of the object 800 at the largest number of points, from among straight lines coinciding with the left side of the object 800. For instance, the straight line 910a runs along a larger number of points than the straight line 911a that coincides with a different portion of the left boundary of object 800. In the same manner, a first straight line corresponding to the upper side 932 of the tetragon 930 may be defined as a straight line 910b that runs along the boundary of the object 800 at the largest number of points, from among straight lines (e.g., 910c, 910d, etc.) at the upper boundary of object 800 corresponding to the upper side 932 of the tetragon 930. By performing the same process with respect to the right side and the lower side of the tetragon 930, a total of four first straight lines may be defined.

Figure 10:
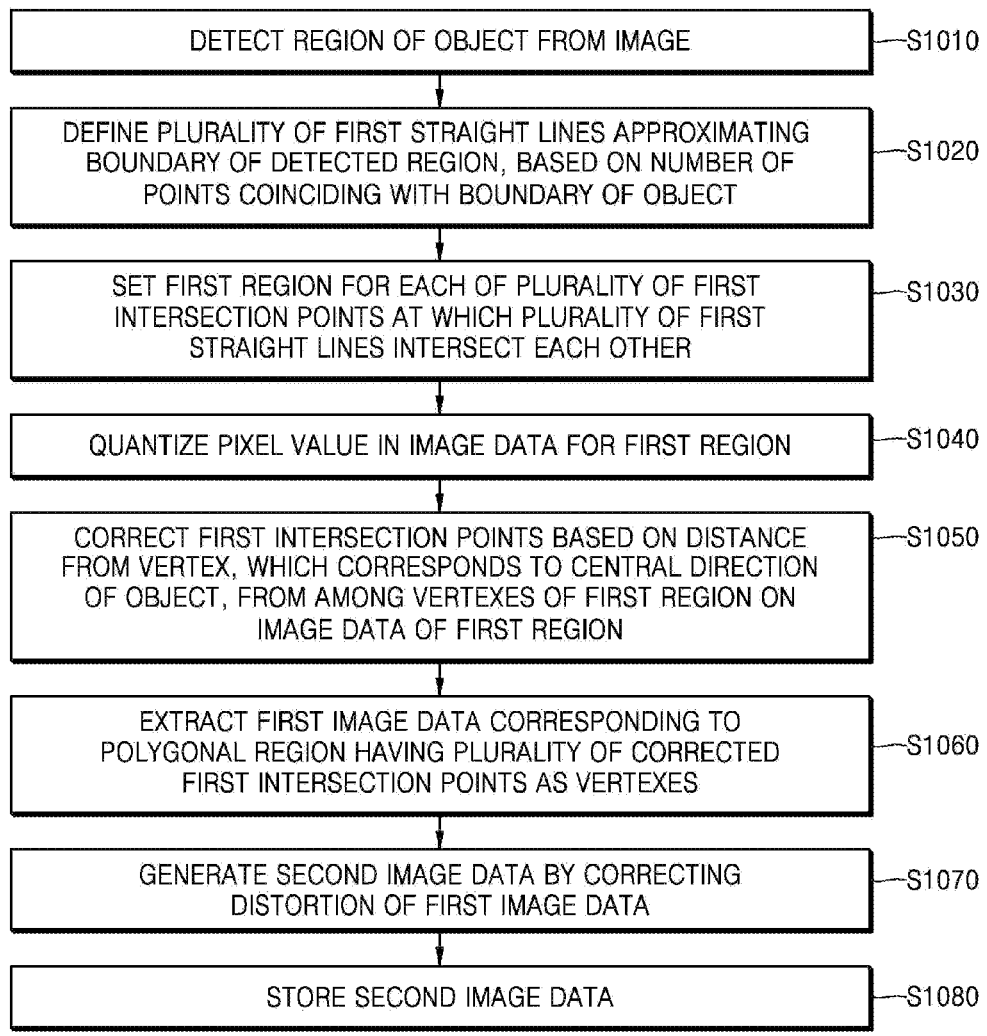
FIG. 10 is a flowchart of a method of correcting intersection points of first straight lines approximating a boundary of a region of an object, according to an exemplary embodiment.

FIG. 10 is a flowchart of a method of correcting intersection points of first straight lines approximating the boundary of the region of an object, according to an exemplary embodiment. The example method of FIG. 10 is explained below with reference to FIG. 11, and is particularly applicable to a case in which a gradation effect exists around the object's boundary, which makes boundary detection more challenging.

Figure 11:
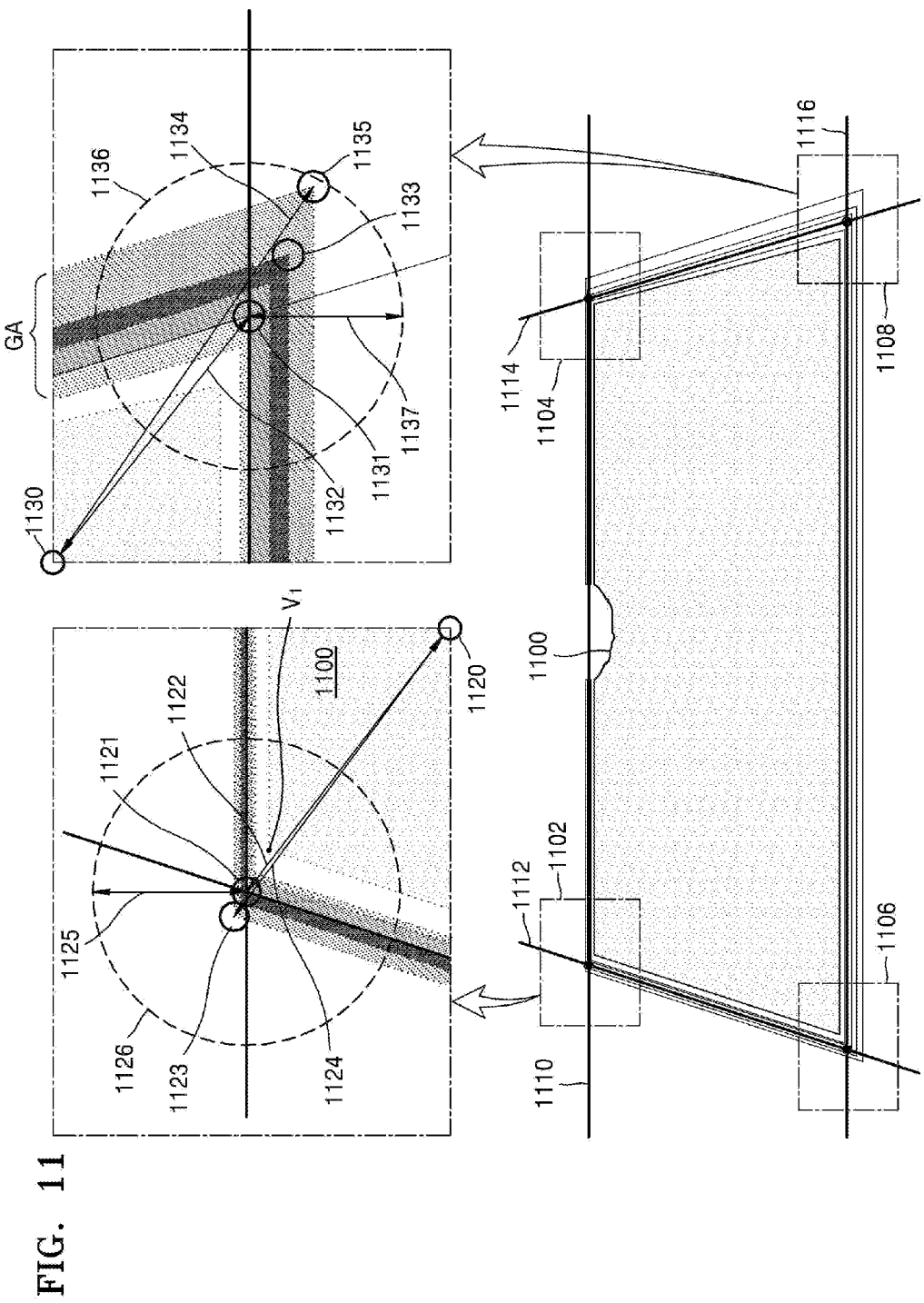
FIG. 11 illustrates a process of correcting intersection points of first straight lines approximating a boundary of a region of an object, according to an exemplary embodiment.

In operation S1010, the image processing apparatus 200 detects the region of an object from an image. For example, when a business card is photographed by using the image processing apparatus 200, the image processing apparatus 200 detects a region corresponding to the business card from a captured image. A segmentation technique may be used as a method of detecting the region of an object, and specifically, a color-based segmentation technique may be used as the method of detecting the region of an object. However, the inventive concept is not limited thereto. Referring to FIG. 11 with respect to operation S1010, the region 1100 of an object may be detected from an image according to an exemplary embodiment. It is also seen in the zoomed-out corner portion 1104 that a gradation area GA exists in the image, outside an otherwise normal boundary of the object. The gradation area GA produces a gradation effect (sometimes referred to as a gradient effect).

In operation S1020, the image processing apparatus 200 defines a plurality of first straight lines approximating the boundary of the region of the object detected in operation S1010. For example, when the detected region of the object has the general form of a tetragon, the plurality of first straight lines may be defined as a plurality of straight lines approximating the four sides of the tetragon. Referring to FIG. 11 with respect to operation S1020, it may be understood that a plurality of first straight lines 1110, 1112, 1114, and 1116 approximating the boundary of the region 1100 of the object detected in operation S1010 are defined according to an exemplary embodiment. Detailed description of this operation is the same as that provided with reference to FIG. 9 and thus is omitted here for brevity.

In operation S1030, the image processing apparatus 200 may set a "first region" for each of a plurality of first intersection points (e.g., a region surrounding each intersection point) at which the plurality of first straight lines intersect each other. The plurality of first intersection points may be regarded as points corresponding to vertexes of image data to be extracted. The first region may have a rectangular form as seen with the four first regions 1102, 1104, 1106 and 1108 around respective intersection points, or a circular form (e.g. region 1126 or 1136) having the first intersection point as the center thereof.

In operation S1040, the image processing apparatus 200 may quantize a pixel value in image data for the first region set in operation S1030. Specifically, the image data is digital information and each pixel includes any information. For example, each pixel may include information, such as hue, saturation, and brightness. An information difference between the pixels including such information may be a quantized predetermined difference. For example, as color information for each pixel is color-quantized, the number of types of colors that are differentiated from one another in image data may decrease, and thus, color information of the pixels may be simplified. When it is difficult to differentiate an object's boundary from background image data adjacent the boundary, or when a gradation effect is applied to image data of a portion adjacent to the boundary, accurate determination of the first straight lines and first intersection points becomes more challenging. Thus, in this case, more accurate points may be found by simplifying a difference between pixels by using color quantization.

In operation S1050, the image processing apparatus 200 may correct the positions of the first intersection points based on a distance from a vertex in a first region to a central point of the object. This process is explained in reference to FIG. 11.

FIG. 11 illustrates a method of correcting intersection points of first straight lines approximating the boundary of the region of an object, according to an exemplary embodiment. In this example, a gradation area GA exists outside the boundary of object 1100, where the object's boundary would otherwise have vertexes such as V1, thus the gradation area may expand the overall size of the imaged object. A first intersection point 1121 for the first region 1102 noted above is determined in the center of image data, to which a gradation effect of an object has been applied, rather than a vertex V1 of the object without the gradation effect. In this case, the region 1100 of the object may not be accurately detected. However, when image data of the first region 1102 is color-quantized, it is easier to differentiate colors from each other since a difference between pixels of some of the image data, to which a gradation effect has been applied, is simplified. In the image data of the first region 1102 color-quantized in this manner, the first intersection point 1121 may be corrected with respect to one of a plurality of vertexes positioned in a region predetermined to be centered on the first intersection point 1121, based on a distance from a vertex corresponding to a central direction of an object. For example, the first intersection point 1121 may be corrected with respect to a vertex 1123, which is most distant from a vertex 1120 of the first region 1102 corresponding to a central direction of the object, from among a plurality of vertexes included in a region 1126 within a predetermined radius 1125 having the first intersection point 1121 as a center. That is, since a distance 1124 from the vertex 1120 of the first region 1102 to the vertex 1123 that is most distant from the vertex 1120 is longer than a distance 1122 between the current first intersection point 1121 and the vertex 1120 of the first region 1102 corresponding to the central direction of the object, the first intersection point 1121 may be corrected with respect to the vertex 1123 that is the furthest from the vertex 1120 of the first region 1102. Thus, instead of approximating a tetragon using the vertex 1121 centralized in the gradation area GA, the outermost vertex 1123 may be used, whereby the approximated tetragon of the object 1100 becomes slightly larger.

Considering now the first region 1108 enlarged in the top right view of FIG. 11, a shadow of an object, formed on a surface on which the object is placed, may be included in an image and in this case, differentiating a boundary portion of the object from the shadow presents a processing challenge. When a difference between pixels in the first region 1108 is simplified by using color-quantization, a first intersection point may be corrected with respect to a vertex 1135, which is most distant from a vertex 1130 of the first region 1108 corresponding to a central direction of the object and is a shadow for a vertex 1133 of the object, from among a first intersection point 1131 wrongly determined in the center of image data, to which a gradation effect of the object has been applied, and a plurality of vertexes included in a region 1136 within a predetermined radius 1137 having the first intersection 1131 as the center thereof. That is, since a distance 1134 from the vertex 1130 of the first region 1108 to the vertex 1135 that is most distant from the vertex 1130 of the first region 1108 is longer than a distance 1132 between the current first intersection point 1131 and the vertex 1130 of the first region 1108 corresponding to the central direction of the object, the first intersection point 1131 may be corrected with respect to the vertex 1135, which is the furthest from the vertex 1130 of the first region 1108. Thus, the outermost vertex 1135 may be used to approximate the tetragon, rather than the inner vertexes 1133 or 1131.

Figure 12:
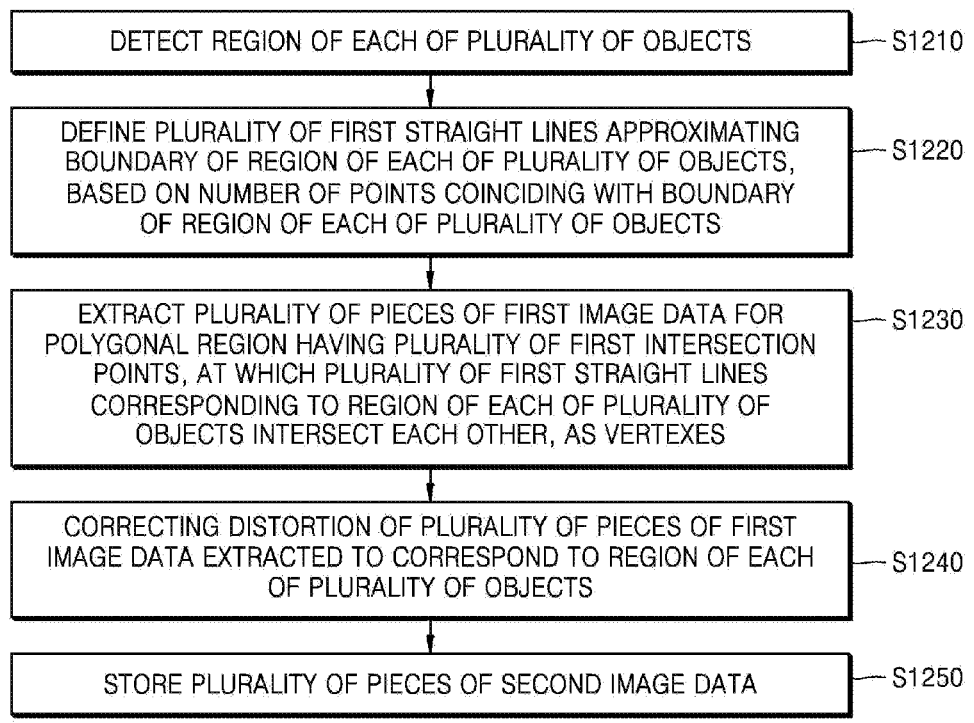
FIG. 12 is a flowchart of a method of generating image data for a plurality of objects, according to an exemplary embodiment.

FIG. 12 is a flowchart of a method of generating image data for a plurality of objects, according to an exemplary embodiment.

Figure 13:
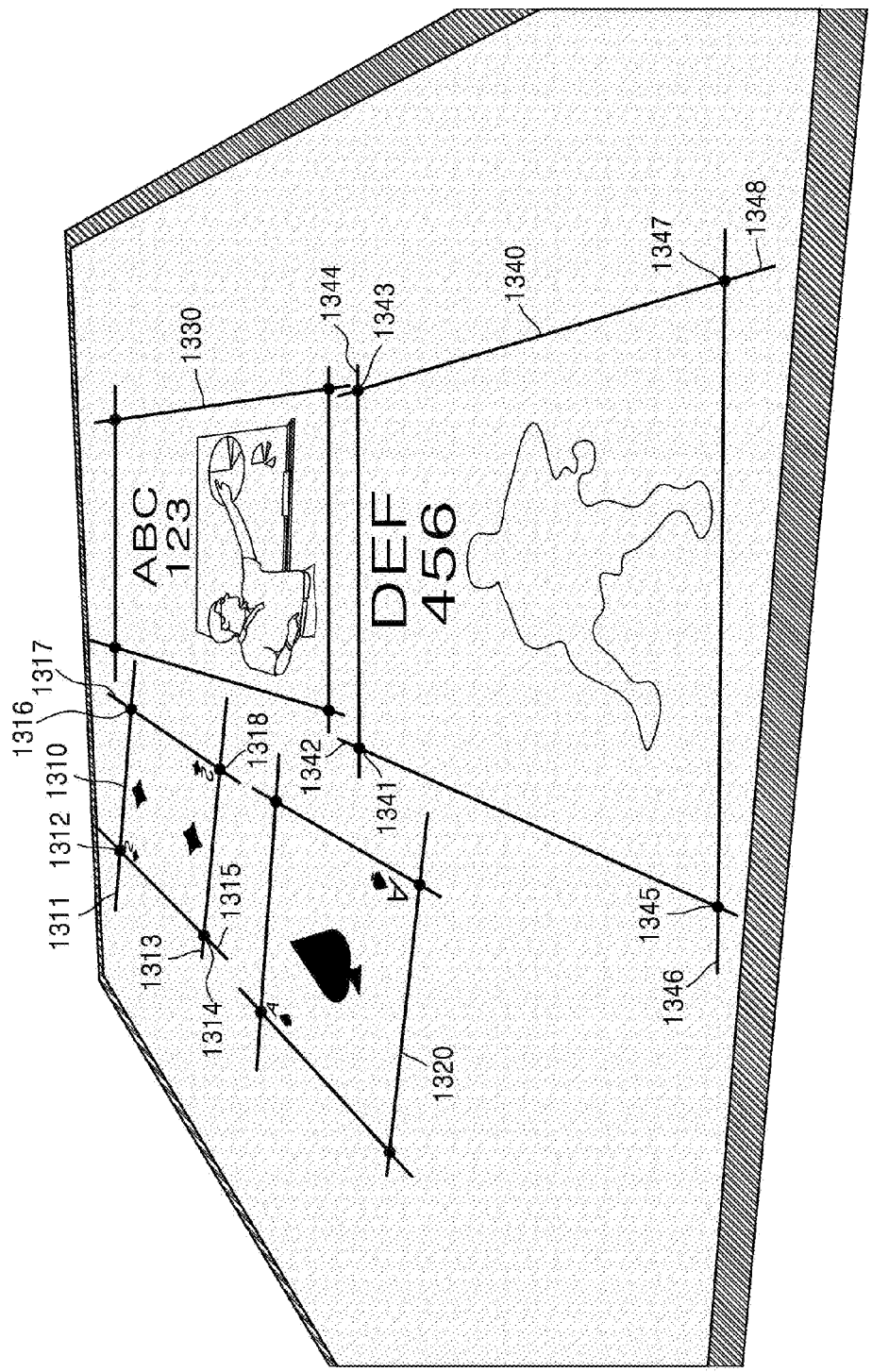
FIG. 13 illustrates a process of detecting intersection points of a plurality of first straight lines approximating a boundary of a region of each of a plurality of objects when an image includes the plurality of objects, according to an exemplary embodiment.

When an image includes a plurality of objects, the image processing apparatus 200 detects the region of each of the plurality of objects (operation S1210). FIG. 13 illustrates a process of detecting intersection points of a plurality of first straight lines approximating the boundary of the region of each of a plurality of objects 1310, 1320, 1330, and 1340 when a common image includes these objects, according to an exemplary embodiment. When multiple objects are to be detected, the region of each object may be detected. A process of detecting the region of each object, e.g., using color segmentation or the like, may be the same as that described in operation S310 of FIG. 3 for a single object, and thus is omitted here for brevity.

In operation S1220, the image processing apparatus 200 defines a plurality of first straight lines approximating the boundary of the region of each object detected in operation S1210. As shown in FIG. 13, a plurality of first straight lines are defined to approximate the boundary of the region of each object. Specifically, four first straight lines 1311, 1313, 1315, and 1317 may be defined with respect to the object 1310, which is one of the objects 1310, 1320, 1330, and 1340 to be detected, and four first straight lines 1342, 1344, 1346, and 1348 may be defined with respect to the object 1340 as another example. (Note that in FIG. 3, for the sake of clarity, the overall image is considered in a perspective view.)

In operation S1230, the image processing apparatus 200 may extract a plurality of pieces of first image data for respective polygonal regions, each having a plurality of first intersection points as vertexes, at which a plurality of first straight lines corresponding to the region of each of the plurality of objects, detected in operation S1220, intersect each other. As shown in FIG. 13, four straight lines approximating the boundary of each object may be defined with respect to each object. In addition, first image data for a tetragonal region having a plurality of first intersection points 1312, 1314, 1316, and 1318, at which the first straight lines 1311, 1313, 1315, and 1317 for the object 1310 intersects each other, as vertexes may be extracted, and first image data for a tetragonal region having a plurality of first intersection points 1341, 1343, 1345, and 1347, at which the first straight lines 1342, 1344, 1346, and 1348 for the object 1340 intersects each other, as vertexes may be extracted. In the same manner, with respect to each of the objects 1320 and 1330, first image data for a respective tetragonal region may be extracted, where each tetragonal region is enclosed by the straight lines.

Figure 14:
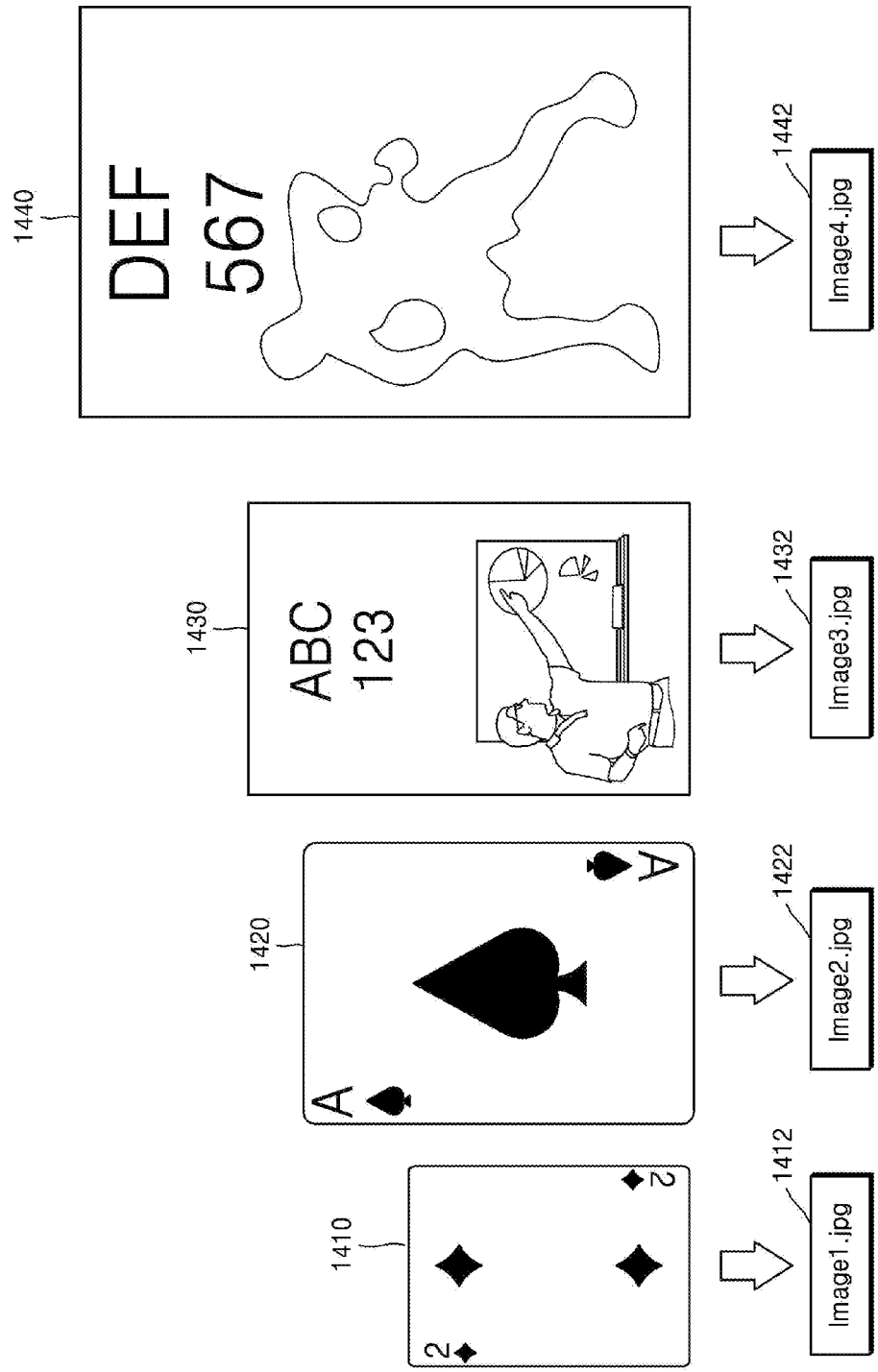
FIG. 14 illustrates a process of generating image data for a region of each of a plurality of objects as a separate file when an image includes the plurality of objects, according to an exemplary embodiment.

In operation S1240, the image processing apparatus 200 may generate a plurality of pieces of second image data by "correcting the distortion" (e.g., providing symmetrical boundaries, as noted above) of the plurality of pieces of first image data extracted in operation S1230. FIG. 14 illustrates a process of generating image data for the respective region of each of a plurality of objects as a separate file when an image includes the plurality of objects, according to an exemplary embodiment. In the example, four pieces of second image data 1410, 1420, 1430, and 1440 may be generated by correcting distortion so that each of four pieces of first image data, each having a generally tetragonal form and extracted in operation S1230, now have a rectangular form. A process of correcting distortion of each of the four pieces of first image data is the same as that described in operation S340 of FIG. 3 and thus is omitted. (For example, although not readily apparent in FIG. 13, each of the "card-like" objects may have been obtained via image capture of real world objects with imperfect boundaries of a generally tetragonal shape, where the boundaries are corrected to rectangular boundaries via the techniques described above.)

In operation S1250, the image processing apparatus 200 may store the plurality of pieces of second image data (i.e., four pieces of second image data 1410, 1420, 1430, and 1440) generated in operation S1240 therein.

The four pieces of second image data 1410, 1420, 1430, and 1440, generated by correcting distortion so that each of four pieces of first image data extracted in FIG. 13 have a rectangular form, may be stored in four separate files 1412, 1422, 1432, and 1442.

Figure 15:
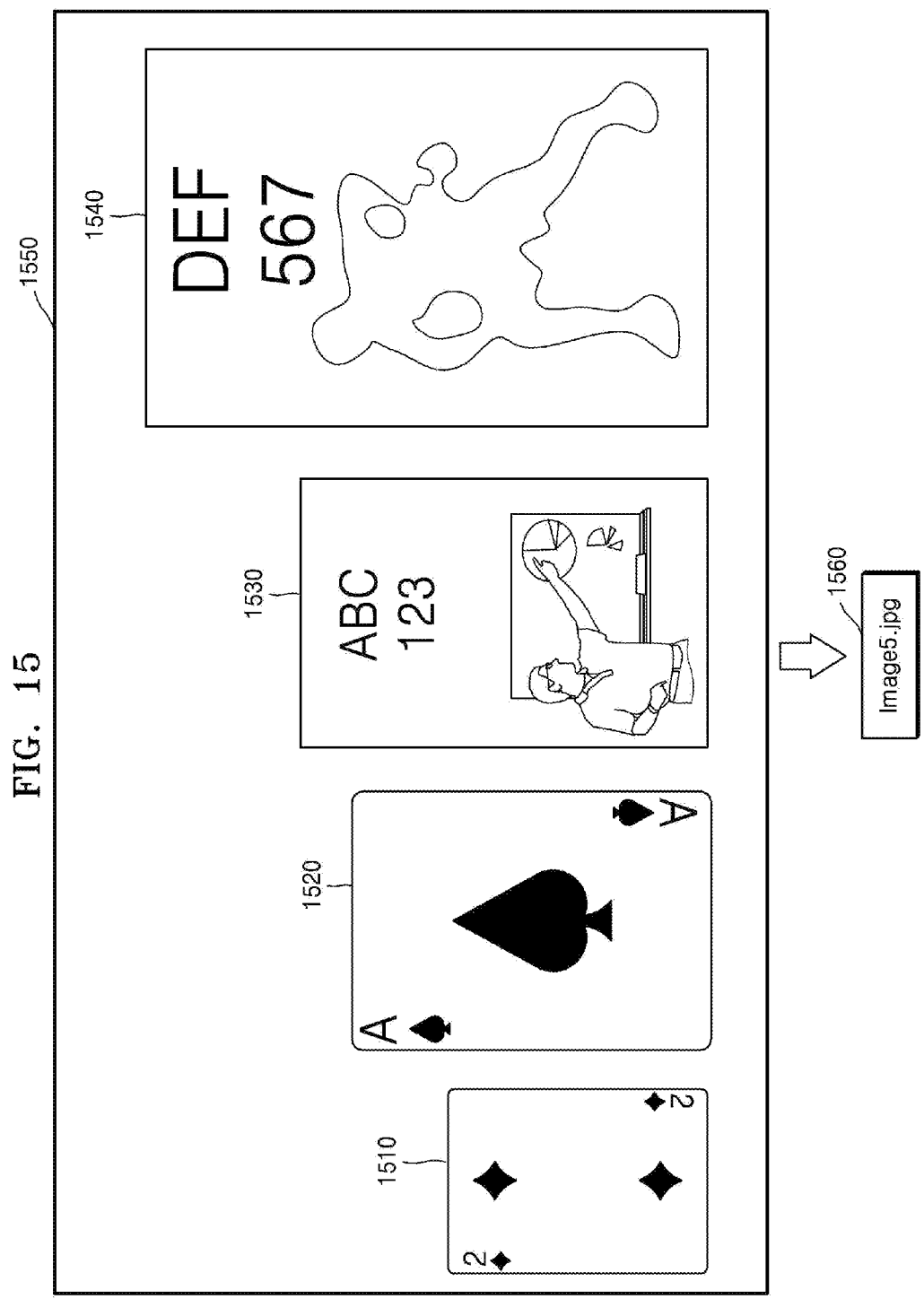
FIG. 15 illustrates a process of generating one piece of image data including a plurality of pieces of image data for regions of a plurality of objects when an image includes the plurality of objects, according to an exemplary embodiment.

FIG. 15 illustrates a process of generating one piece of image data including a plurality of pieces of image data for the regions of a plurality of objects when an image includes the plurality of objects, according to an exemplary embodiment. One set of image data 1550, which includes four pieces of second image data 1510, 1520, 1530, and 1540 generated by correcting distortion so that each of the four pieces of first image data extracted in FIG. 13 have a rectangular form, may be generated and stored in a single file 1560.

Figure 16:
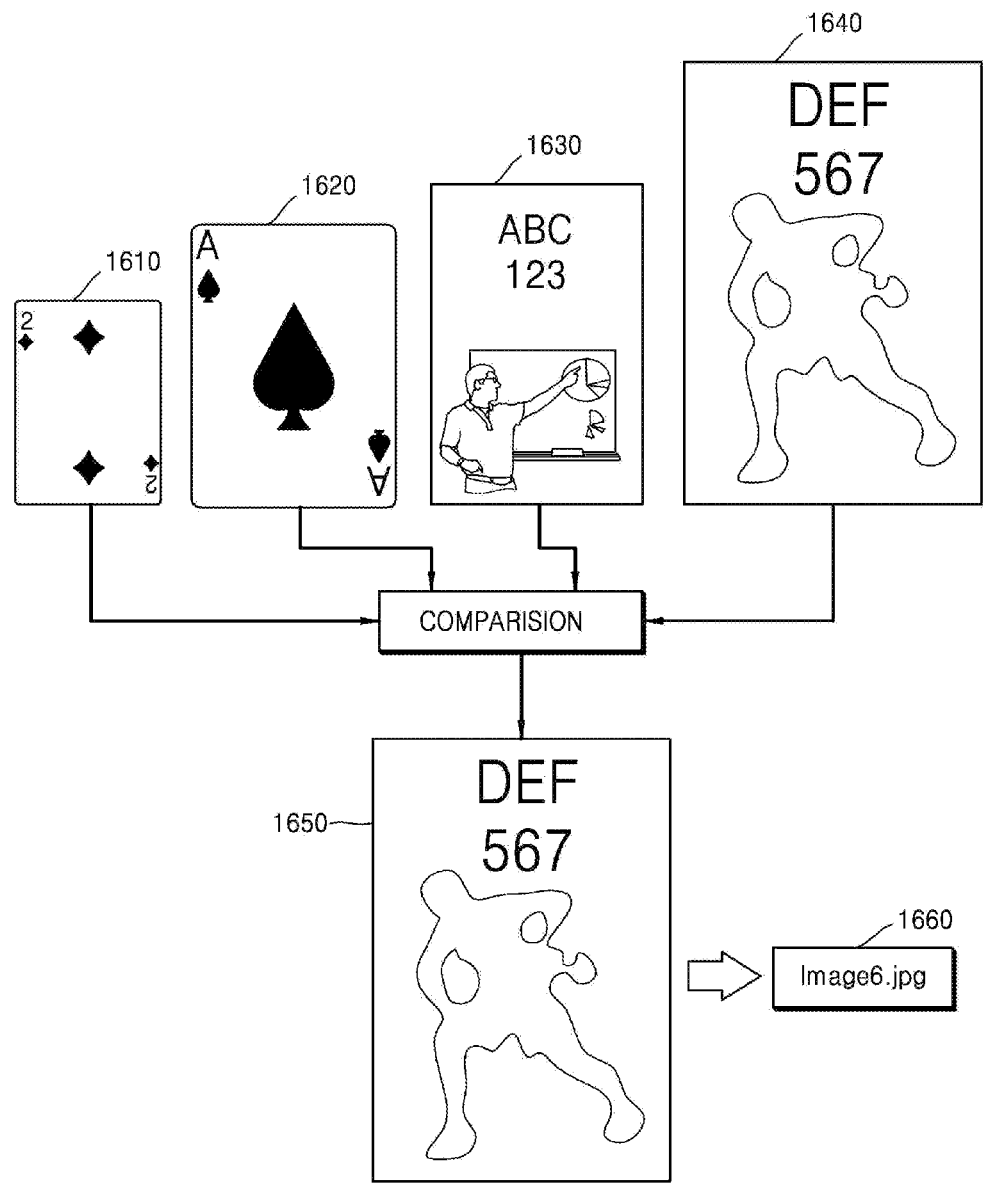
FIG. 16 illustrates a process of generating only a largest one of a plurality of pieces of image data for regions of a plurality of objects as a file when an image includes the plurality of objects, according to an exemplary embodiment.

FIG. 16 illustrates a process of generating only the largest one of a plurality of pieces of image data for the regions of a plurality of objects as a file when an image includes the plurality of objects, according to an exemplary embodiment. In the example, four pieces of second image data 1610, 1620, 1630, and 1640 may be generated by correcting distortion so that each of four pieces of first image data each having a generally tetragonal form, extracted in FIG. 13, are corrected to a rectangular form. In this case, the sizes of the generated four pieces of second image data 1610, 1620, 1630, and 1640 may be compared with each other, and only the second image data 1640 having the largest size may be stored in a file 1660.

Figure 17:
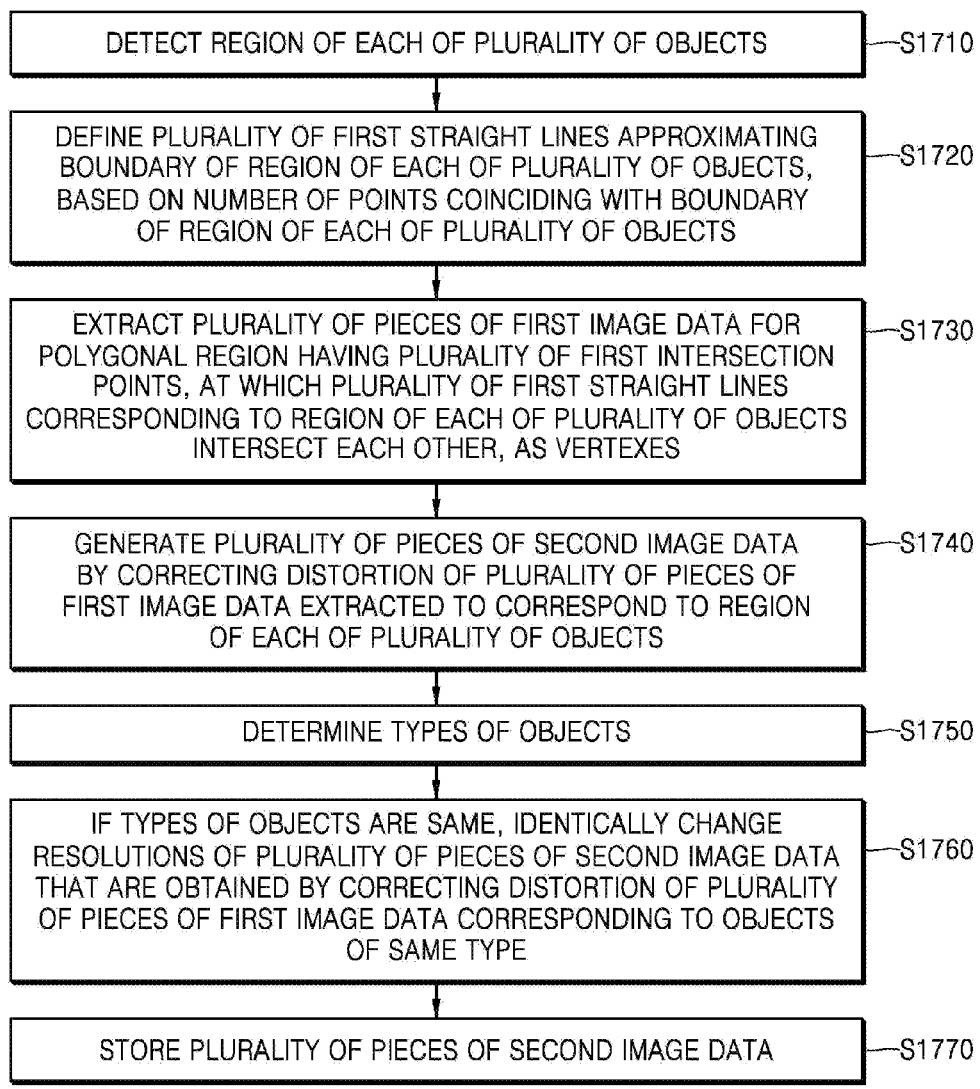
FIG. 17 is a flowchart of a method of determining the type of each of a plurality of objects when an image includes the plurality of objects and converting a plurality of pieces of image data for regions of objects of the same type into a plurality of pieces of image data having the same resolution, according to an exemplary embodiment.

FIG. 17 is a flowchart of a method of determining the type of each of a plurality of objects when an image includes the plurality of objects and converting a plurality of pieces of image data for the regions of objects of the same type into a plurality of pieces of image data having the same resolution, according to an exemplary embodiment.

When an image includes a plurality of objects, the image processing apparatus 200 detects the respective region of each of the plurality of objects (operation S1710). A detailed description of operation S1710 is the same as that of operation S1210 of FIG. 12 and thus is omitted.

In operation S1720, the image processing apparatus 200 defines a plurality of first straight lines approximating the boundary of the region of each object detected in operation S1710. A detailed description of operation S1720 is the same as that of operation S1220 of FIG. 12 and thus is omitted.

In operation S1730, the image processing apparatus 200 may extract a plurality of pieces of first image data for a polygonal region having a plurality of first intersection points as vertexes (where four intersecting first straight lines bound the region of each of the plurality of objects). A detailed description of operation S1730 is the same as that of operation S1230 of FIG. 12 and thus is omitted.

In operation S1740, the image processing apparatus 200 may generate a plurality of pieces of second image data by correcting the distortion of the plurality of pieces of first image data extracted in operation S1730. A detailed description of operation S1740 is the same as that of operation S1240 of FIG. 12 and thus is omitted.

In operation S1750, the image processing apparatus 200 analyzes the plurality of pieces of second image data generated in operation S1740 and determines the type of detected object based on the analysis. The type of object may be determined by analyzing letters included in the object by using an optical character recognition (OCR) method or by analyzing other image data (e.g., obtained from Internet) which is within a similar range of image data. Note that other ways of determining object types are also possible and within the scope of the inventive concept. Referring again to FIG. 14, it may be determined that some of the four pieces of second image data 1410, 1420, 1430, and 1440, that is, two pieces of second image data 1410 and 1420, correspond to a "poker card" based on the analysis for the second image data 1410, 1420, 1430, and 1440. Accordingly, it may be determined that some of the four pieces of second image data 1410, 1420, 1430, and 1440, that is, two pieces of second image data 1410 and 1420, correspond to the same types of objects. In addition, by analyzing letter information of the second image data 1410, 1420, 1430, and 1440, "ABC" and "123" may be detected with respect to the second image data 1430 and "DEF" and "567" may be detected with respect to the second image data 1440. By searching, e.g., on the Internet or other information source, letter information detected in this manner, it may be determined that an object including "ABC" is a book titled "ABC" and an object including "DEF" is a book titled "DEF". Accordingly, it may be determined that some of the four pieces of second image data 1410, 1420, 1430, and 1440, that is, the two pieces of second image data 1430 and 1440, correspond to the same type of object, i.e., "books".

In operation S1760, if it is determined that the types of objects corresponding to a plurality of pieces of second image data are the same, the image processing apparatus 200 may identically change resolutions of the plurality of pieces of second image data that are obtained by correcting the distortion of a plurality of pieces of first image data corresponding to the objects of the same type (operation S1760). For example, if it is determined that some of the four pieces of second image data 1410, 1420, 1430, and 1440, that is, two pieces of second image data 1410 and 1420, correspond to the same types of objects "poker cards" and some of the four pieces of second image data 1410, 1420, 1430, and 1440, that is, two pieces of second image data 1430 and 1440, correspond to the same types of objects "books", as just described with reference to FIG. 14, the two pieces of second image data 1410 and 1420 corresponding to the same types of objects "poker cards" may be converted into two pieces of image data 1810 and 1820 (refer to FIG. 18) having the same size. Also, the two pieces of second image data 1430 and 1440 corresponding to the same types of objects "books" may be converted into two pieces of image data 1830 and 1840 (refer to FIG. 18) having the same size. In this case, a conversion size or a conversion rate may be determined in consideration of the forms (e.g., aspect ratios) of detected objects and the average resolution of a plurality of pieces of first image data extracted to correspond to second image data whose type is determined to be the same as the types of the detected objects. It should be noted, however, that the inventive concept is not limited thereto, as other ways of converting the image data may be provisioned.

In operation S1770, the image processing apparatus 200 may store the plurality of second image data obtained in operation S1760.

Figure 18:
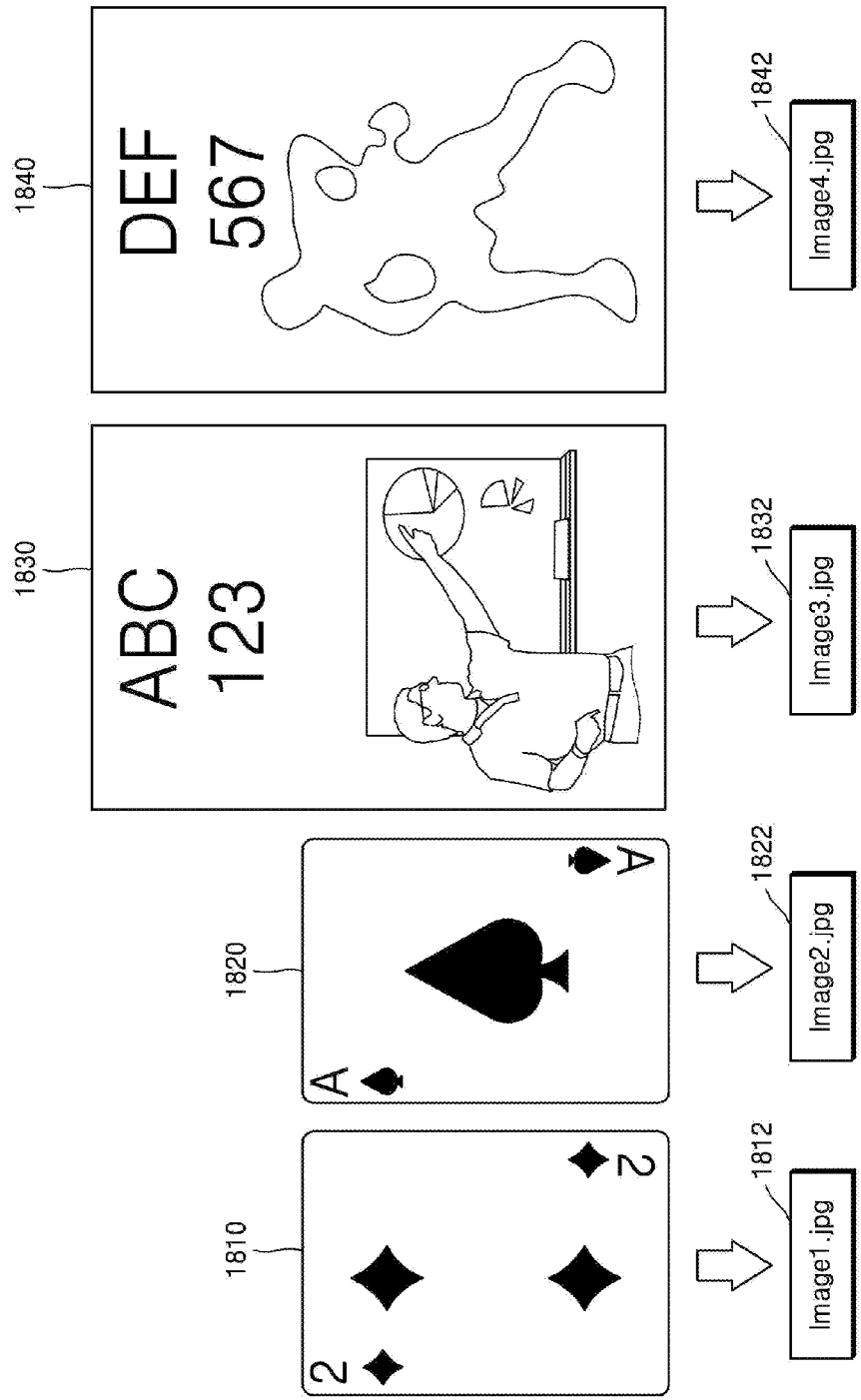
FIG. 18 illustrates a process of determining the type of each of a plurality of objects when an image includes the plurality of objects, converting a plurality of pieces of image data for regions of objects of the same type into a plurality of pieces of image data having the same resolution, and storing the plurality of pieces of image data having the same resolution as separate files, according to an exemplary embodiment.

As just described, FIG. 18 illustrates a process of determining the type of each of a plurality of objects when an image includes the plurality of objects, converting a plurality of pieces of image data for the regions of objects of the same type into a plurality of pieces of image data having the same resolution, and storing the plurality of pieces of image data having the same resolution as separate files, according to an exemplary embodiment. As described above, the two pieces of second image data 1410 and 1420 of FIG. 14, which correspond to the same types of objects "poker cards", may be converted into the two pieces of image data 1810 and 1820 having the same size, and the two pieces of second image data 1430 and 1440 corresponding to the same types of objects "books" may also be converted into the two pieces of image data 1830 and 1840 having the same size. The four pieces of image data 1810, 1820, 1830, and 1840 may be stored in different files 1812, 1822, 1832, and 1842 separately.

Figure 19:
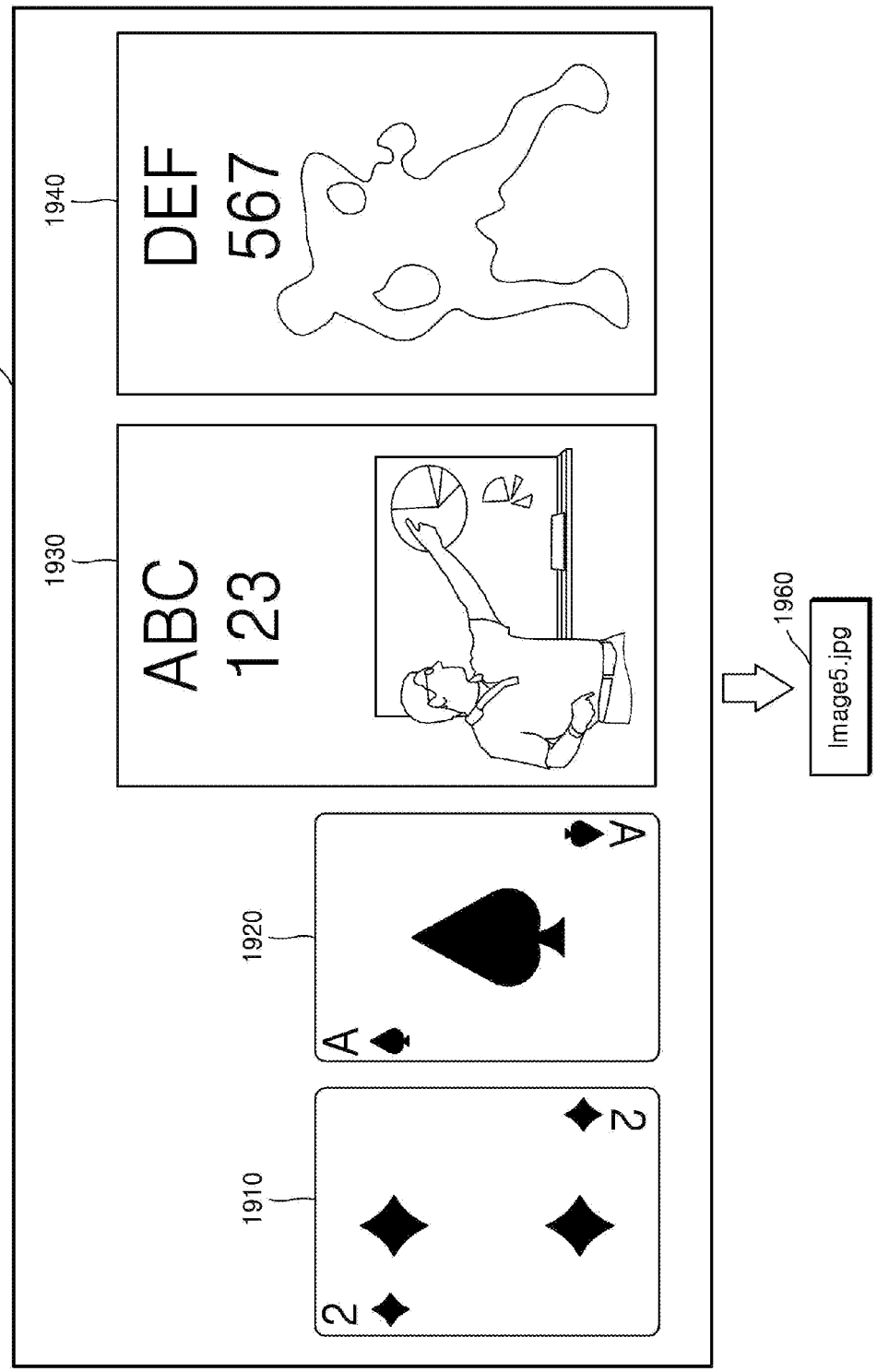
FIG. 19 illustrates a process of determining the type of each of a plurality of objects when an image includes the plurality of objects, converting a plurality of pieces of image data for regions of objects of the same type into a plurality of pieces of image data having the same resolution, and storing the plurality of pieces of image data having the same resolution as a single file, according to an exemplary embodiment.

FIG. 19 illustrates a process of determining the type of each of a plurality of objects when an image includes the plurality of objects, converting a plurality of pieces of image data for the regions of objects of the same type into a plurality of pieces of image data having the same resolution, and storing the plurality of pieces of image data having the same resolution as a single file, according to an exemplary embodiment. Similar to the case of FIG. 18, the two pieces of second image data 1410 and 1420 of FIG. 14, which correspond to the same types of objects "poker cards", may be converted into the two pieces of image data 1910 and 1920 having the same size, and the two pieces of second image data 1430 and 1440 corresponding to the same types of objects "books" may also be converted into the two pieces of image data 1930 and 1940 having the same size. In addition, one set of image data 1950 including the four pieces of image data 1910, 1920, 1930, and 1940 may be generated and then stored in a single file 1960.

Figure 20:
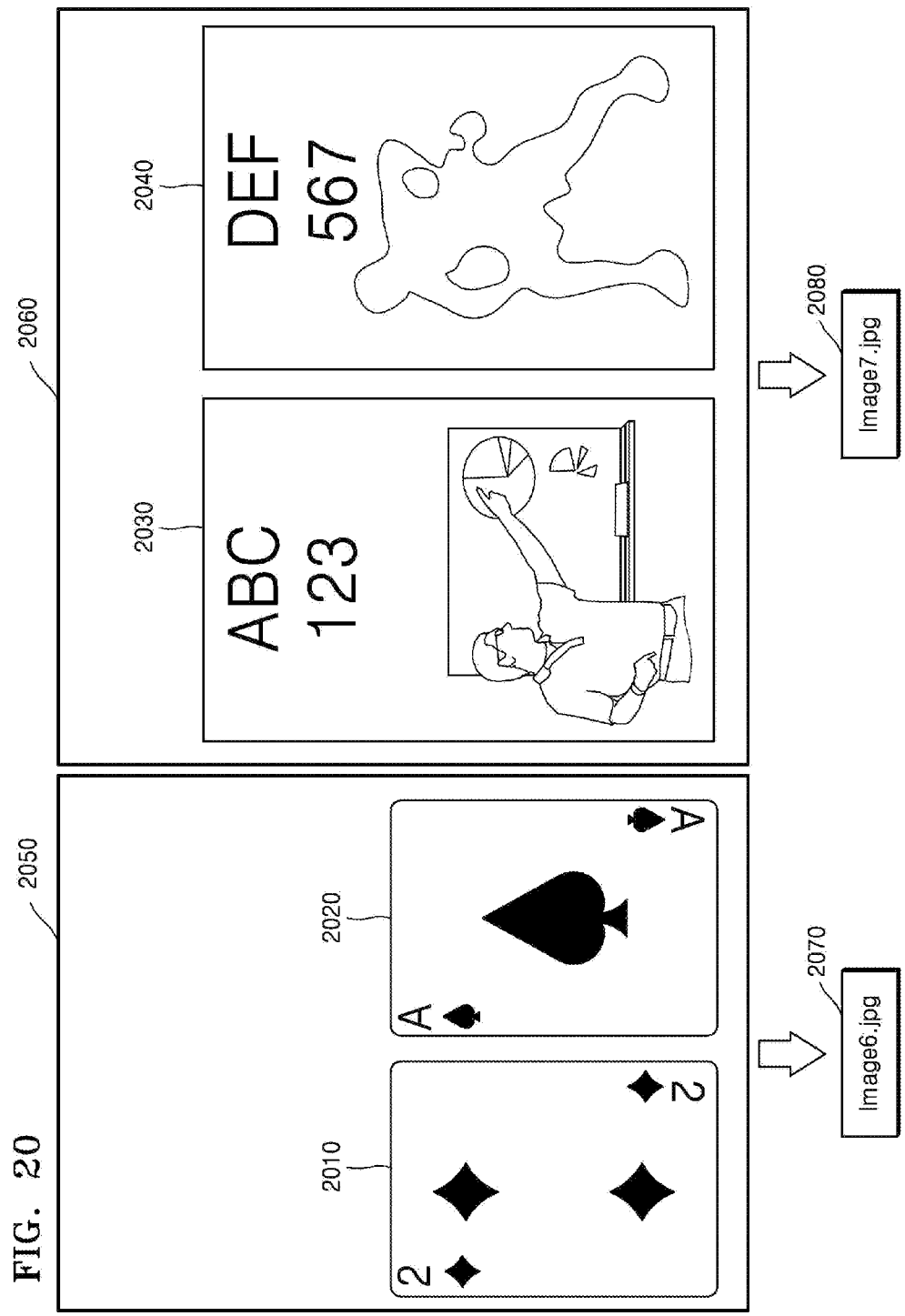
FIG. 20 illustrates a process of determining the type of each of a plurality of objects when an image includes the plurality of objects, converting a plurality of pieces of second image data for regions of objects of the same type into a plurality of pieces of second image data having the same resolution, and storing the plurality of pieces of second image data having the same resolution in separate files based on the types of objects, according to an exemplary embodiment.

FIG. 20 illustrates a process of determining the type of each of a plurality of objects when an image includes the plurality of objects, converting a plurality of pieces of second image data for the regions of objects of the same type into a plurality of pieces of second image data that may have the same resolution, and storing the plurality of pieces of second image data that may have the same resolution in separate files based on the types of objects, according to an exemplary embodiment.

Specifically, one set of image data 2050 may be generated to include a plurality of pieces of second image data 2010 and 2020 that correspond to "poker card" and which may have the same resolution, and one set of image data 2060 may be generated to include a plurality of pieces of second image data 2030 and 2040 that correspond to "book" and which may have the same resolution. The image data 2050 including the plurality of pieces of second image data 2010 and 2020 corresponding to "poker card" may be stored in a single file 2070, and the image data 2060 including the plurality of pieces of second image data 2030 and 2040 corresponding to "book" may be stored in another single file 2080.

Figure 21:
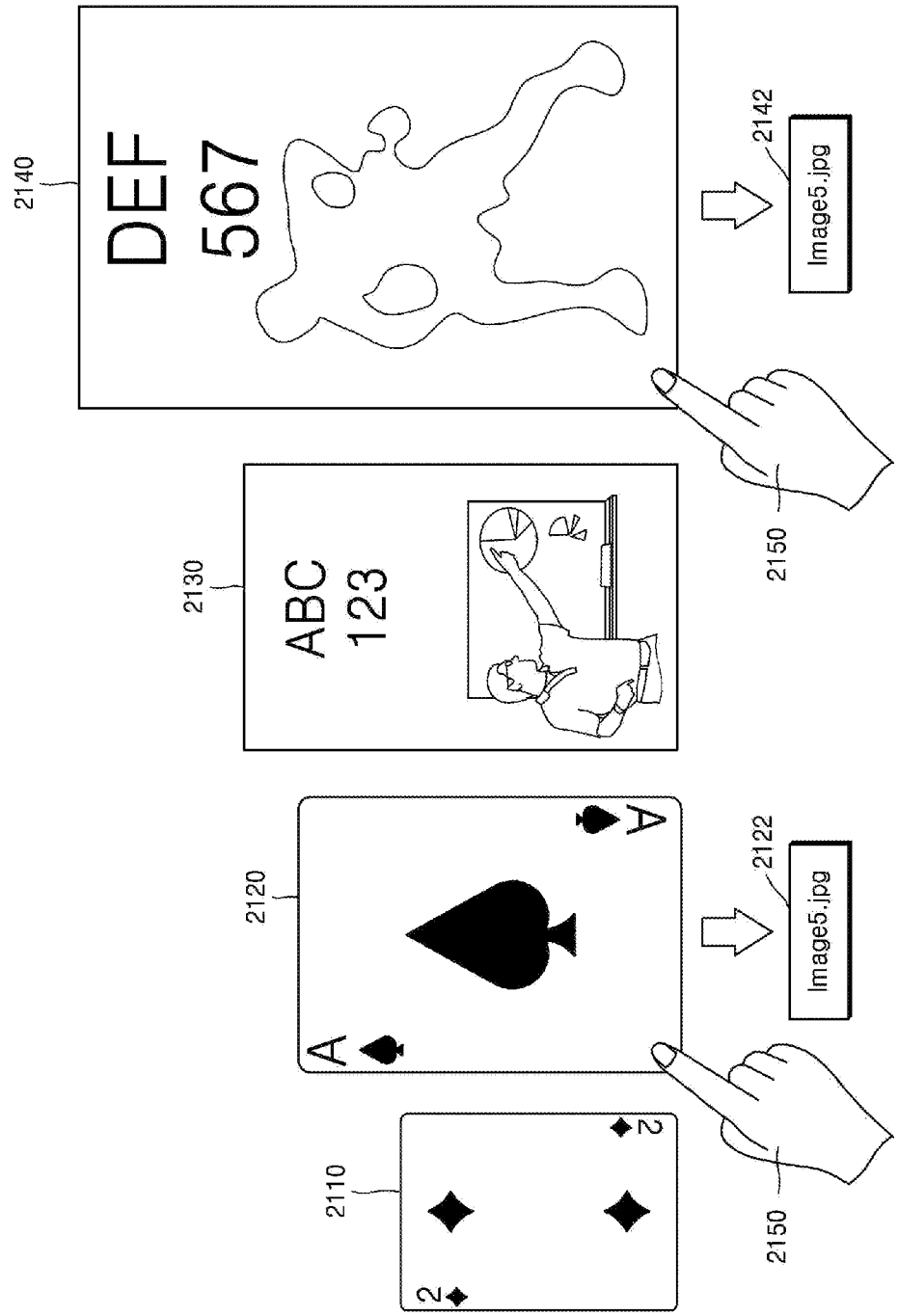
FIG. 21 illustrates a process of storing only image data selected from among a plurality of pieces of image data for a plurality of objects when an image includes the plurality of objects, according to an exemplary embodiment.

FIG. 21 illustrates a process of storing only image data selected from among a plurality of pieces of image data for a plurality of objects when an image includes the plurality of objects, according to an exemplary embodiment. As illustrated, a plurality of pieces of second image data 2120, 2120, 2130, and 2140 for a plurality of objects may be generated. In an exemplary embodiment, image processing apparatus 200 may further include a receiver or user input means that may receive an input signal representing a user input command, and may store therein at least one piece of second image data selected based on the input signal received through the receiver. The receiver may correspond to the user input unit 145 illustrated in FIG. 1. A user may store at least one of a plurality of pieces of second image data generated in an image processing apparatus in the storage unit 120 through the user input unit 145. For example, when the second image data is displayed on display unit 110 and some (e.g., image data 2120 and 2140) of the generated plurality of pieces of second image data 2120, 2120, 2130, and 2140 are selected based on an input signal 2150 input through the receiver, the selected second image data 2120 and 2140 may be stored in the storage unit 120.

Figure 22:
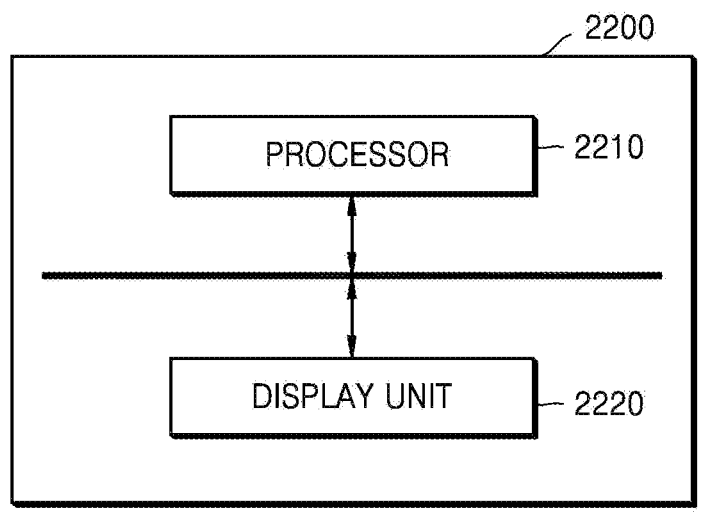
FIG. 22 is a block diagram of an image processing apparatus that may detect regions of a plurality of objects included in an image and correct distortion of the detected regions of the plurality of objects, according to an exemplary embodiment.

FIG. 22 is a block diagram of an image processing apparatus 2200 that may detect the regions of a plurality of objects included in an image and correct the distortion of the detected regions of the plurality of objects, according to an exemplary embodiment. Detailed characteristics of the image processing apparatus 2200 are described with reference to a flowchart of an image processing method of FIG. 23.

Figure 23:
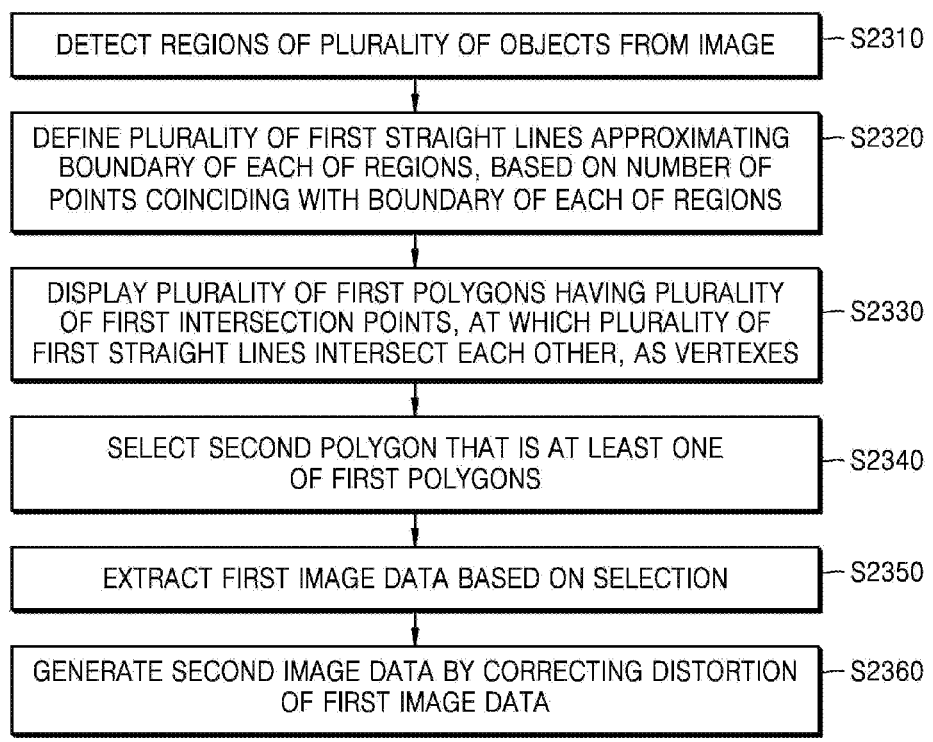
FIG. 23 is a flowchart of a method of selecting some of a plurality of objects included in an image and generating image data based on a selection result, according to an exemplary embodiment.

FIG. 23 is a flowchart of a method of selecting some of a plurality of objects included in an image and generating image data based on a selection result, according to an exemplary embodiment. Specifically, the image processing apparatus 2200 may select an object (e.g., in accordance with a user input command), of which distortion is required to be corrected, from among a plurality of objects included in an image and may correct only the distortion of image data corresponding to the selected object.

In operation S2310, a processor 2210 of the image processing apparatus 2200 may detect the regions of a plurality of objects from an image. Detailed description of operation S2310 may correspond to that of operation S1210 of FIG. 12 and thus is omitted.

In operation S2320, the processor 2210 of the image processing apparatus 2200 may define a plurality of first straight lines approximating the boundary of each of the regions detected in operation S2310, based on the number of points at which each of the plurality of first straight lines coincides with the boundary of each of the detected regions. Detailed description of operation S2320 may correspond to that of operation S1220 of FIG. 12 and thus is omitted.

Figure 24:
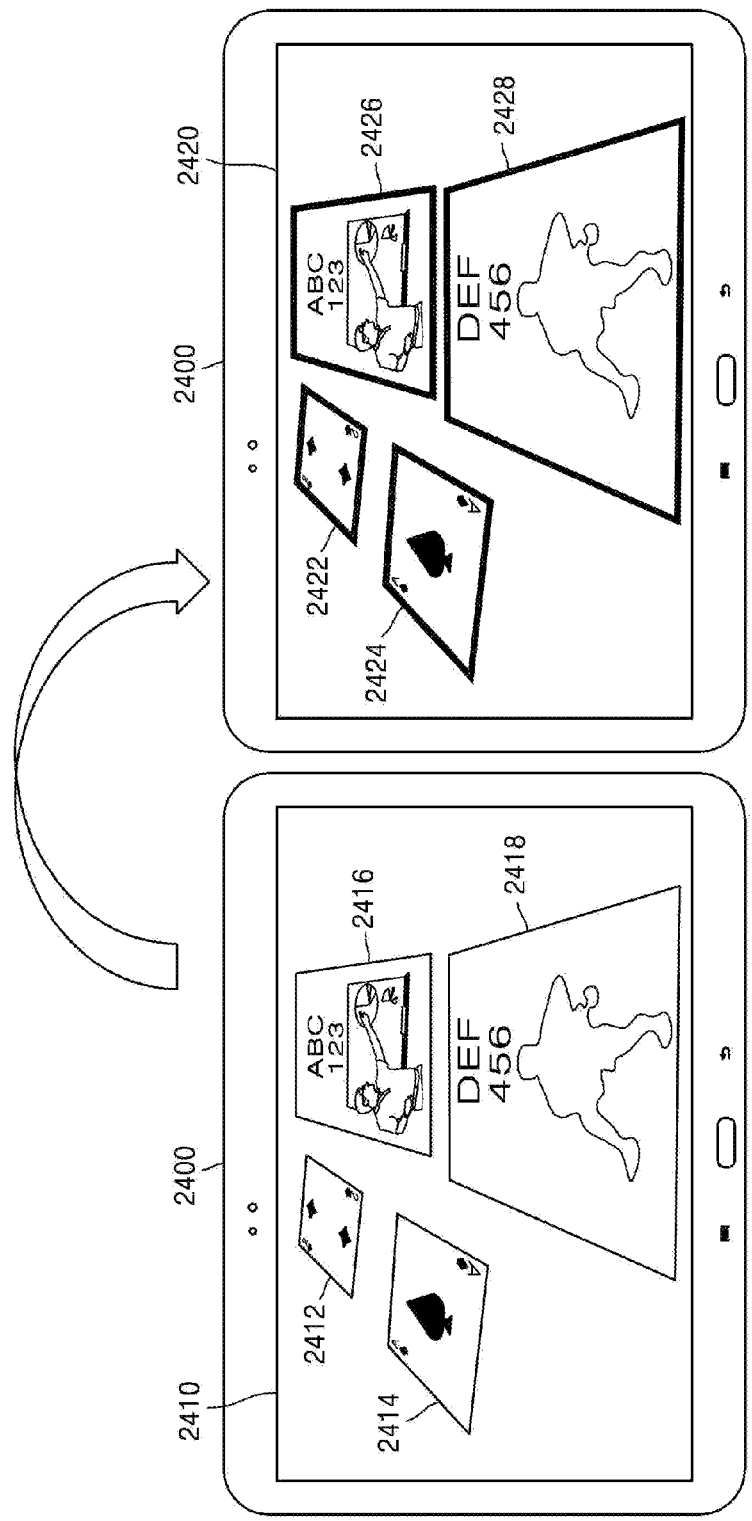
FIG. 24 illustrates a process of detecting polygons corresponding to contour lines of regions of a plurality of objects when an image includes the plurality of objects, according to an exemplary embodiment.

In operation S2330, the processor 2210 may control a display unit 2220 so as to display a plurality of first polygons having a plurality of first intersection points, at which the plurality of first straight lines defined in operation S2320 intersect each other, as vertexes. FIG. 24 illustrates a process in which an image processing apparatus 2400 displays a plurality of first polygons for a plurality of objects included in an image. The image processing apparatus 2400 may correspond to the image processing apparatus 2200 of FIG. 22. In the process of FIG. 24, a processor (i.e., the processor (2210)) of the image processing apparatus 2400 may control a display unit (i.e., the display unit 2210 so as to display a plurality of first polygons 2422, 2424, 2426, and 2428 for a plurality of objects 2412, 2414, 2416, and 2418 included in an image 2410. According to an exemplary embodiment, the processor 2210 of the image processing apparatus 2400 may control the display unit 2220 to display first intersection points corresponding to vertexes of the first polygons 2422, 2424, 2426, and 2428. (In the example, the vertexes are the four sharp corners of the image corrected objects 2422, 2424, 2426 and 2428.)

In operation S2340, the processor 2210 of the image processing apparatus 2200 may select (e.g. in accordance with a user command or a predetermined criteria) a second polygon that is at least one of the first polygons. According to an exemplary embodiment, the processor 2210 of the image processing apparatus 2400 may select all of the first polygons as second polygons. Accordingly, the processor 2210 of the image processing apparatus 2200 may correct the distortion of image data corresponding to all of the first polygons for the objects, detected from the image.

In operation S2350, the processor 2210 of the image processing apparatus 2200 may extract first image data based on the selection in operation S2340. According to an exemplary embodiment, the first image data may be extracted only with respect to first polygons selected as the second polygons. In another embodiment or another user selection option, the first image data may be extracted only with respect to first polygons that are not selected as the second polygons. That is, the image processing apparatus 2200 may select a first polygon that is desired to be extracted or may select a first polygon that is desired not to be extracted.

In operation S2360, the processor 2210 of the image processing apparatus 2200 may generate second image data by correcting the distortion of the first image data extracted in operation S2350. Detailed description of operation S2360 may correspond to that of operation S1240 of FIG. 12 and thus is omitted.

Figure 25:
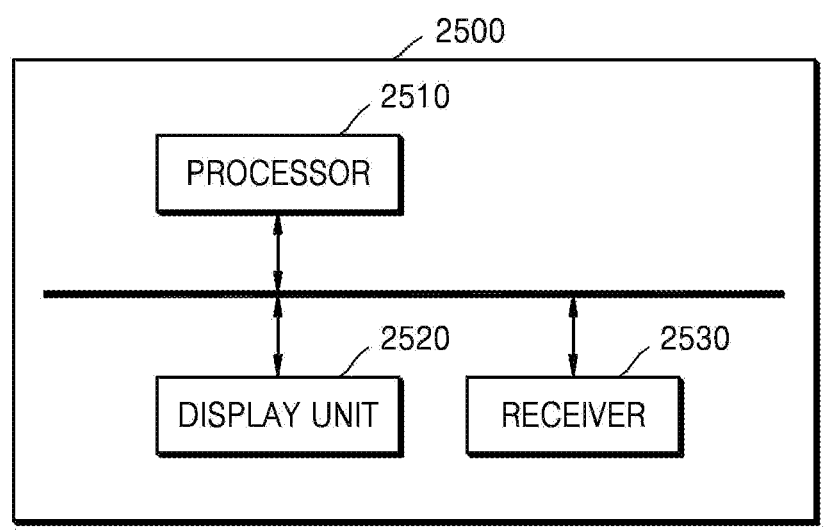
FIG. 25 is a block diagram of an image processing apparatus that generates second image data by selecting a second polygon based on an external signal received through a receiver, according to an exemplary embodiment.
Figure 26:
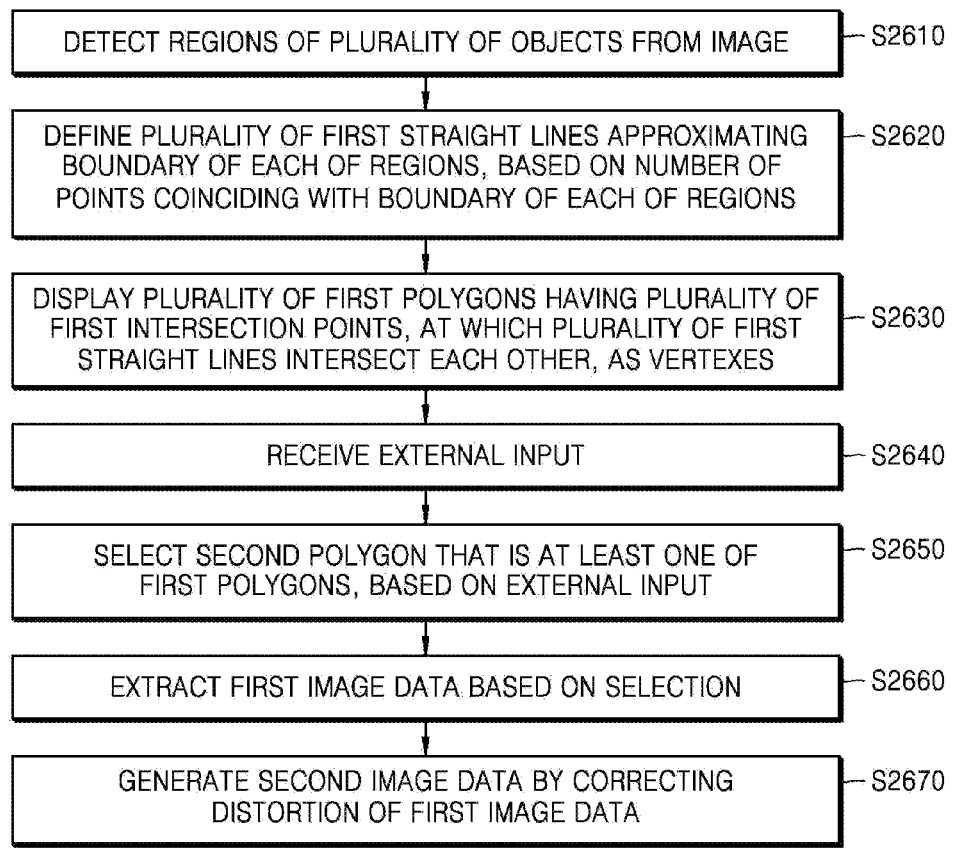
FIG. 26 is a flowchart of an image processing method of selecting a second polygon based on an external signal received by the image processing apparatus of FIG. 25 and correcting distortion of image data based on a selection result, according to an exemplary embodiment.

FIG. 25 is a block diagram of an image processing apparatus 2500 that generates second image data by selecting a second polygon based on an external signal received through a receiver 2530, according to an exemplary embodiment. FIG. 26 is a flowchart of an image processing method of selecting a second polygon based on an external signal received by the image processing apparatus 2500 of FIG. 25 and correcting the distortion of image data based on the selection.

In operation S2610, a processor 2510 of the image processing apparatus 2500 may detect the regions of a plurality of objects from an image. Detailed description of operation S2610 may correspond to that of operation S2310 of FIG. 23 and thus is omitted.

In operation S2620, the processor 2510 of the image processing apparatus 2500 may define a plurality of first straight lines approximating the boundary of each of the regions detected in operation S2610, based on the number of points at which each of the plurality of first straight lines coincide with the boundary of each of the detected regions. Detailed description of operation S2620 may correspond to that of operation S2320 of FIG. 23 and thus is omitted.

In operation S2630, the processor 2510 of the image processing apparatus 2500 may control a display unit 2520 so as to display a plurality of first polygons having a plurality of first intersection points, at which the plurality of first straight lines defined in operation S2620 intersect each other, as vertexes. Detailed description of operation S2630 may correspond to that of operation S2330 of FIG. 23 and thus is omitted.

In operation S2640, the image processing apparatus 2500 may receive an external input through the receiver 2530. The receiver 2530 of FIG. 25 may correspond to the user input unit 145 of FIG. 1.

In operation S2650, the processor 2510 of the image processing apparatus 2500 may select a second polygon that is at least one of the first polygons, based on the external input received in operation S2640. According to an exemplary embodiment, the processor 2510 of the image processing apparatus 2500 may select the first polygons, displayed in operation S2630, as second polygons before receiving an external signal. (Such initial selection may have been due to a suitable user selection of one of more polygons.) In this case, the processor 2510 may deselect previously selected second polygons based on the external signal.

Figure 27:
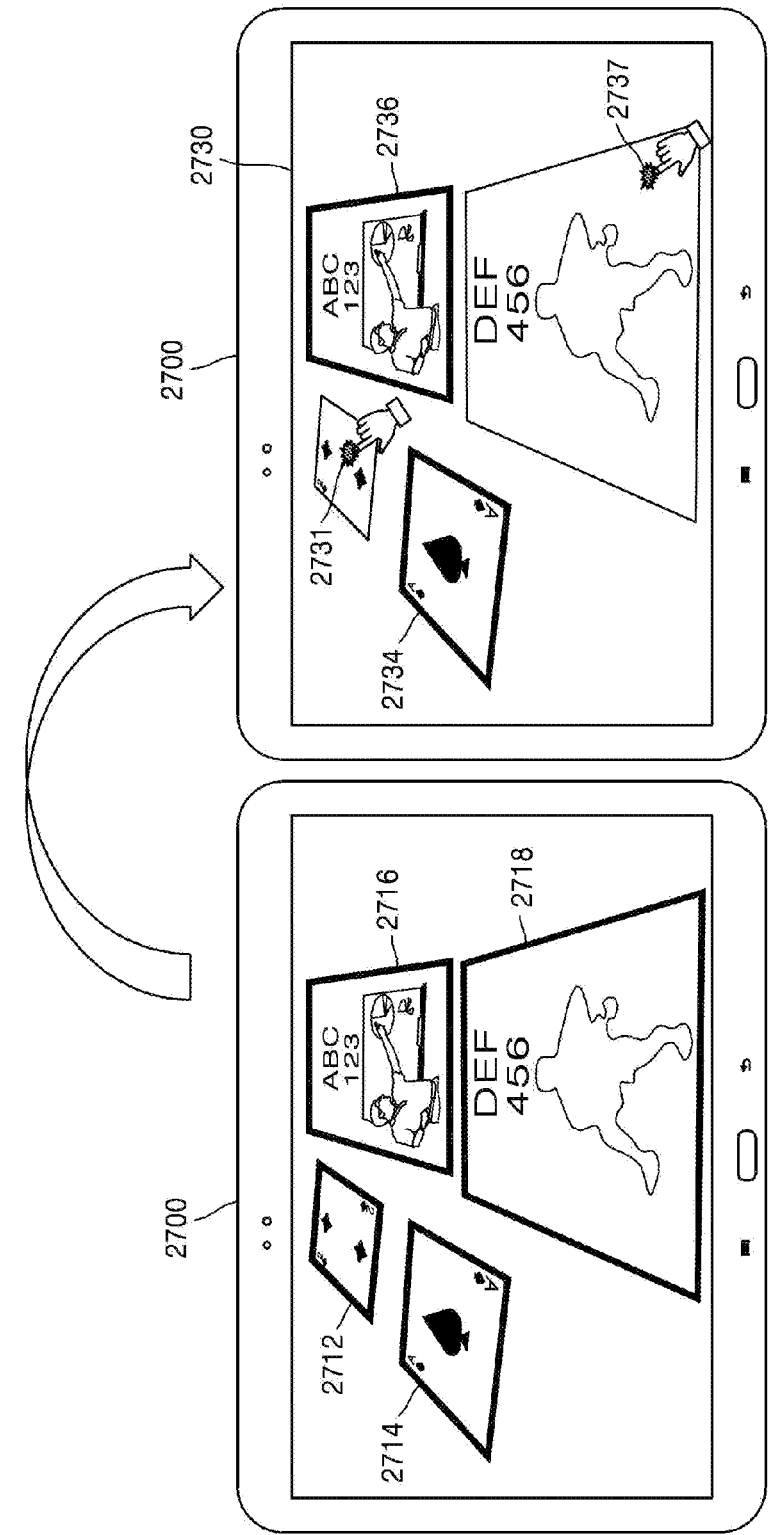
FIG. 27 illustrates a process in which an image processing apparatus selects second polygons, which are some of a plurality of first polygons, so as not to extract image data of the selected second polygons, based on an external input, according to an exemplary embodiment.

FIG. 27 illustrates a process in which an image processing apparatus 2700 selects second polygons, which are some of a plurality of first polygons, not to extract image data of the selected second polygons, based on an external input, according to an exemplary embodiment. The image processing apparatus 2700 of FIG. 27 may correspond to the image processing apparatus 2500 of FIG. 25. As shown in FIG. 27, the image processing apparatus 2700 may display first polygons 2712, 2714, 2716, and 2718 on the display unit 2520 in operation S2630. The processor 2510 may select the first polygons 2712, 2714, 2716, and 2718, displayed in operation S2630, as second polygons before receiving external inputs 2731 and 2737 (examples of which are user touch selections to a touch screen). Accordingly, when the external inputs 2731 and 2737 are received, the first polygons 2712 and 2718 corresponding to the external inputs 2731 and 2737 may be released from a state in which the first polygons 2712 and 2718 has been selected as second polygons. The first polygons 2712 and 2718 of which selection is released may not be displayed on the display unit 2520. That is, only second polygons 2734 and 2736 corresponding to the first polygons 2714 and 2716 of which selection is not released may be displayed on the display unit 2520.

Figure 28:
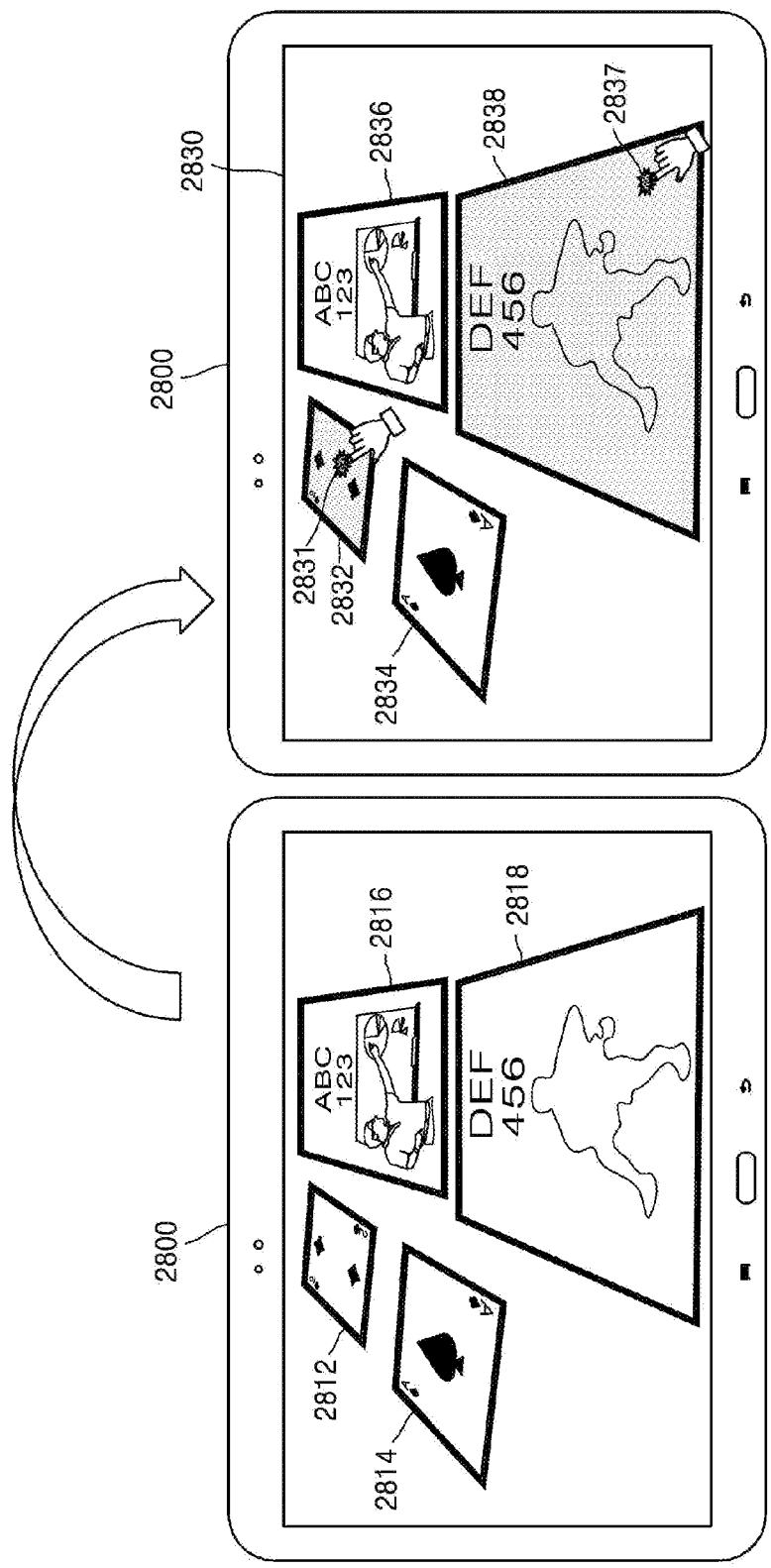
FIG. 28 illustrates a process in which an image processing apparatus selects second polygons, which are some of a plurality of first polygons, to extract image data of the selected second polygons, based on an external input, according to an exemplary embodiment.

FIG. 28 illustrates a process in which an image processing apparatus 2800 selects second polygons, which are some of a plurality of first polygons, to extract image data of the selected second polygons, based on an external input, according to an exemplary embodiment. The image processing apparatus 2800 of FIG. 28 may correspond to the image processing apparatus 2500 of FIG. 25. As shown in FIG. 28, the image processing apparatus 2800 may display first polygons 2812, 2814, 2816, and 2818 on the display unit 2520 in operation S2630. The processor 2510 may not select the first polygons 2812, 2814, 2816, and 2818, displayed in operation S2630, as second polygons before receiving external inputs 2831 and 2837 (e.g. touch input commands). Accordingly, when the external inputs 2831 and 2837 are received, the first polygons 2812 and 2818 corresponding to the external inputs 2831 and 2837 may be selected as second polygons 2832 and 2838. When the first polygons 2812 and 2818 are selected as the second polygons 2832 and 2838 in response to the external inputs 2831 and 2837, the processor 2510 of the image processing apparatus 2800 may display third polygons 2834 and 2836, which correspond to the first polygons 2814 and 2816 other than the first polygons 2812 and 2818 selected as the second polygons 2832 and 2838, in a different manner than that of the second polygons 2832 and 2838. For example, in FIG. 28, the processor 2510 of the image processing apparatus 2800 may display the second polygons 2832 and 2838 in a different manner than the third polygons 2834 and 2836, which are not shaded, by shading the second polygons.

In operation S2660, the processor 2510 of the image processing apparatus 2500 may extract first image data based on the selection in operation S2650. As shown in FIG. 27, the processor 2510 of the image processing apparatus 2500 may extract first image data for the first polygons 2714 and 2716 other than the first polygons 2712 and 2718 selected as second polygons based on the external inputs 2731 and 2737. In addition, as shown in FIG. 28, the processor 2510 of the image processing apparatus 2500 may extract first image data for the second polygons 2832 and 2838 selected based on the external inputs 2831 and 2837. A process of extracting the first image data may correspond to operation S2350 of FIG. 23, and thus, detailed description thereof is omitted.

In operation S2670, the processor 2510 of the image processing apparatus 2500 may generate second image data by correcting the distortion of the first image data extracted in operation S2660. Detailed description of operation S2670 may correspond to that of operation S2360 of FIG. 23 and thus is omitted.

According to an exemplary embodiment, the processor 2510 of the image processing apparatus 2500 may select a second polygon based on characteristics of a first polygon. Specifically, the processor 2510 of the image processing apparatus 2500 may determine whether a first polygon satisfies a predetermined criterion, e.g., the size of the first polygon that is displayed on the display unit 2520, the degree of distortion, a distance from the center of a screen of the display unit 2520, and a distance from the image processing apparatus 2500, or any suitable combination of these criteria. The processor 2510 of the image processing apparatus 2500 may select the first polygon(s) satisfying the predetermined criterion as the second polygon.

Figure 29:
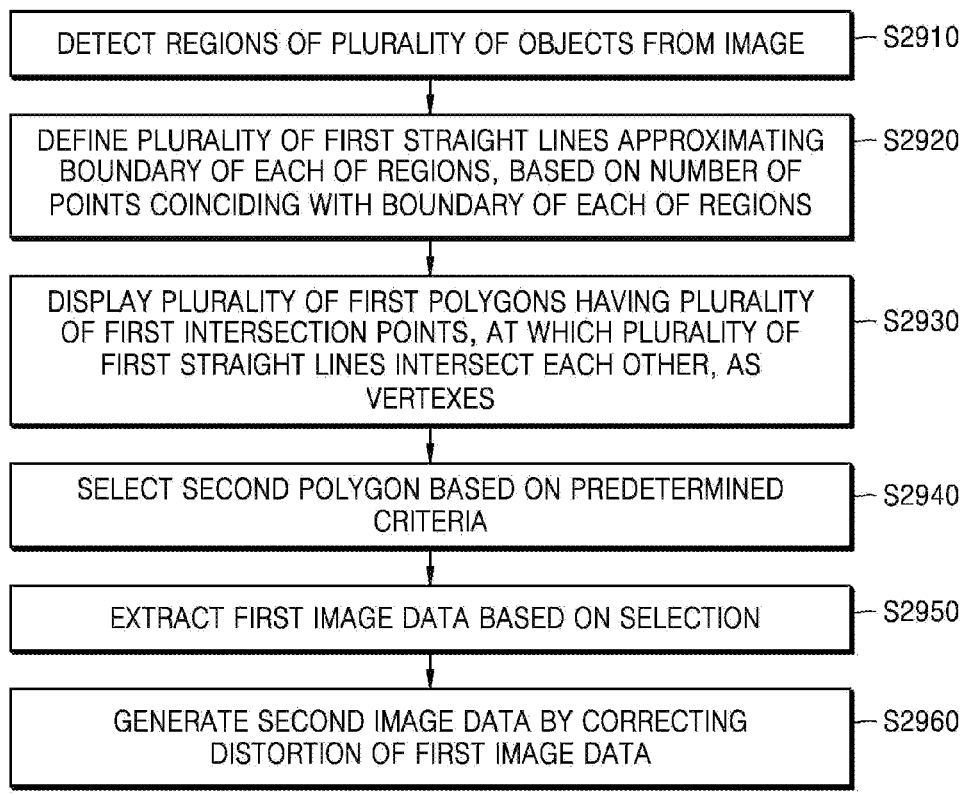
FIG. 29 is a flowchart of an image processing method including a process of selecting a second polygon, which is one of a plurality of first polygons, to extract image data of the selected second polygon, based on a predetermined criterion, according to an exemplary embodiment.

FIG. 29 is a flowchart of an image processing method including a process of selecting a second polygon, which is one of a plurality of first polygons, to extract image data of the selected second polygon, based on a predetermined criterion, according to an exemplary embodiment. The method may be understood with reference to FIG. 30.

In operation S2910, the processor 2510 of the image processing apparatus 2500 may detect the regions of a plurality of objects from an image. Detailed description of operation S2910 may correspond to that of operation S2310 of FIG. 23 and thus is omitted.

In operation S2920, the processor 2510 of the image processing apparatus 2500 may define a plurality of first straight lines approximating the boundary of each of the regions detected in operation S2910, based on the number of points at which each of the plurality of first straight lines coincide with the boundary of each of the detected regions. Detailed description of operation S2920 may correspond to that of operation S2320 of FIG. 23 and thus is omitted.

In operation S2930, the processor 2510 of the image processing apparatus 2500 may control the display unit 2520 so as to display a plurality of first polygons having a plurality of first intersection points, at which the plurality of first straight lines defined in operation S2920 intersect each other, as vertexes. Detailed description of operation S2930 may correspond to that of operation S2330 of FIG. 23 and thus is omitted.

Figure 30:
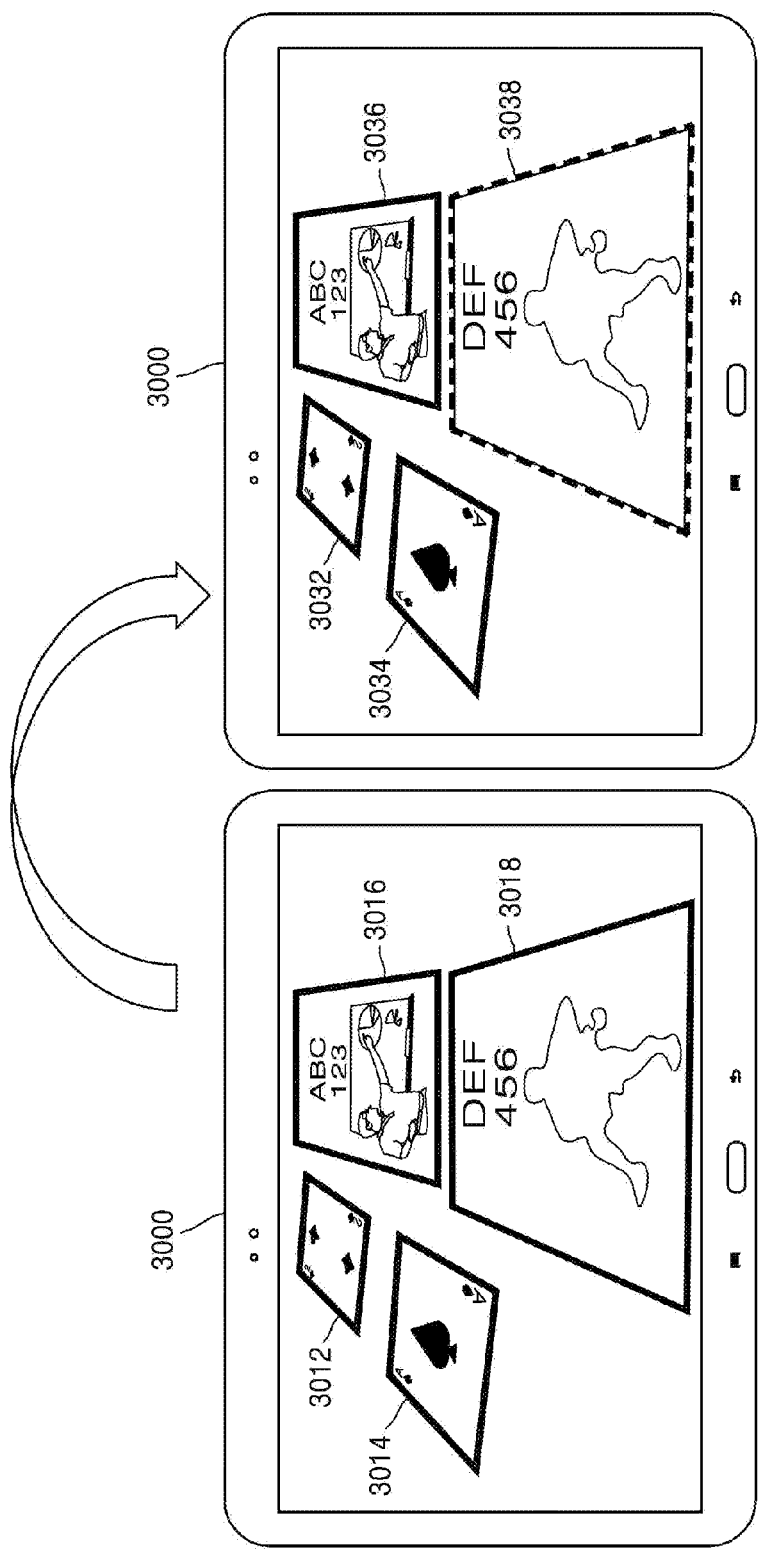
FIG. 30 illustrates a process in which a processor of an image processing apparatus selects a second polygon, which is one of a plurality of first polygons, to extract image data of the selected second polygon, based on a predetermined criterion, according to an exemplary embodiment.

In operation S2940, the processor 2510 of the image processing apparatus 2500 may select a second polygon based on a predetermined criterion. According to an exemplary embodiment, the predetermined criterion may be the size of a first polygon, the degree of distortion, a distance from the center of a screen of the display unit 2520, or a distance from the image processing apparatus 2500. Other criteria are also available. FIG. 30 illustrates a process in which the processor 2510 of an image processing apparatus 3000 selects a second polygon, which is one of a plurality of first polygons, to extract image data of the selected second polygon, based on a predetermined criterion, according to an exemplary embodiment. The image processing apparatus 3000 of FIG. 30 may correspond to the image processing apparatus 2500 of FIG. 25. As shown in FIG. 30, the image processing apparatus 3000 may display first polygons 3012, 3014, 3016, and 3018 on the display unit 2520 in operation S2930. The processor 2510 may not select the first polygons 3012, 3014, 3016, and 3018, displayed in operation S2930, as second polygons before receiving an external input. According to an exemplary embodiment, the processor 2510 of the image processing apparatus 3000 may select a second polygon based on a predetermined criterion. As illustrated in FIG. 30, the processor 2510 of the image processing apparatus 3000 may select a largest polygon 3018 from among of first polygons 3012, 3014, 3016, and 3018 displayed on the display unit 2520 as a second polygon 3038. The second polygon 3038 may be displayed differently from first polygons 3032, 3034, and 3036 unselected in the display unit 2520 of the image processing apparatus 3000. For example, the second polygon 3038 may be displayed with a dotted line instead of a solid line or may be displayed with another color. Accordingly, the second polygon 3030 may be visually distinguished by a user viewing the display, from the unselected polygons 3032, 3034, and 3036.

In operation S2950, the processor 2510 of the image processing apparatus 3000 may extract first image data based on the selection in operation S2940. Detailed description of operation S2950 may correspond to that of operation S2350 of FIG. 23 and thus is omitted.

In operation S2960, the processor 2510 of the image processing apparatus 3000 may generate second image data by correcting the distortion of the first image data extracted in operation S2950. Detailed description of operation S2960 may correspond to that of operation S2360 of FIG. 23 and thus is omitted.

Figure 31:
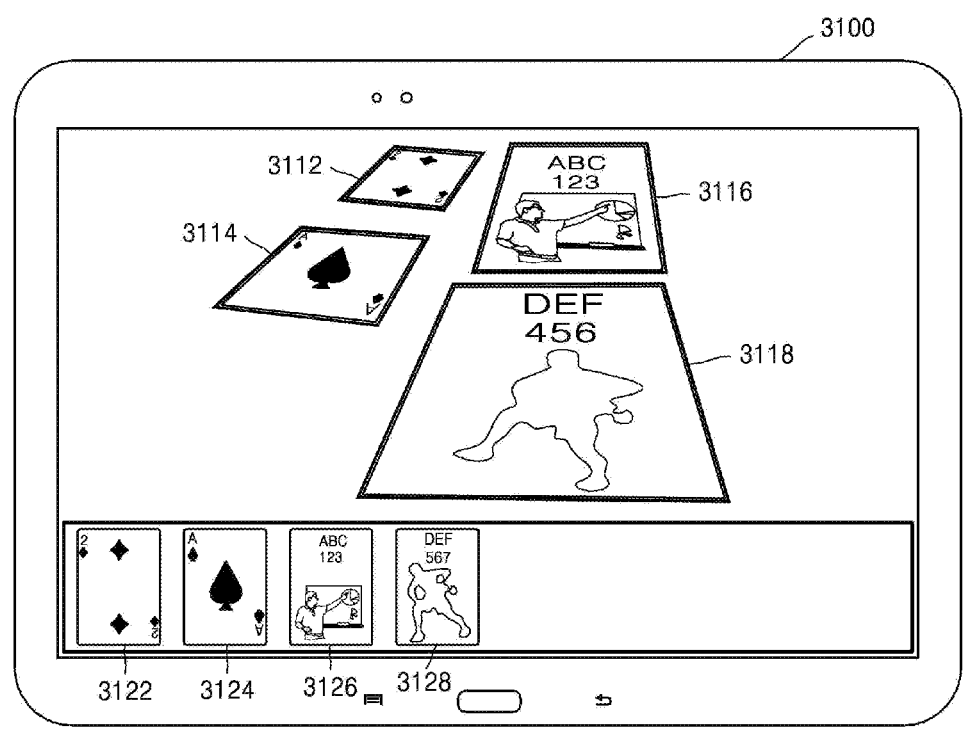
FIG. 31 is a diagram in which a thumbnail image of second image data corresponding to a first polygon extracted by a processor of an image processing apparatus is displayed on a display unit.

FIG. 31 is a diagram in which a thumbnail image of second image data corresponding to a first polygon extracted by the processor 2510 of the image processing apparatus 3100 is displayed on the display unit 2520. The image processing apparatus 3100 of FIG. 31 may correspond to the image processing apparatus 2200 of FIG. 22. As shown in FIG. 31, the processor 2210 of the image processing apparatus 3100 (hereafter in this discussion, "the processor") may control the display unit 2220 to display first polygons 3112, 3114, 3116, and 3118 by using the image processing method of FIG. 23. The processor may extract first image data corresponding to the first polygons 3112, 3114, 3116, and 3118. The processor may generate second image data by correcting the distortion of the extracted first image data. According to an exemplary embodiment, the processor may control the display unit 2229 to display thumbnail images 3122, 3124, 3126, and 3128 of the generated second image data on the display unit 2220. According to an exemplary embodiment, the processor may select a second polygon(s) based on an external input and extract first image data based on the selection. The processor may generate second image data by correcting the distortion of the extracted first image data, and may control the display unit 2520 to display a thumbnail image of the generated second image data on the display unit 2520.

Figure 32:
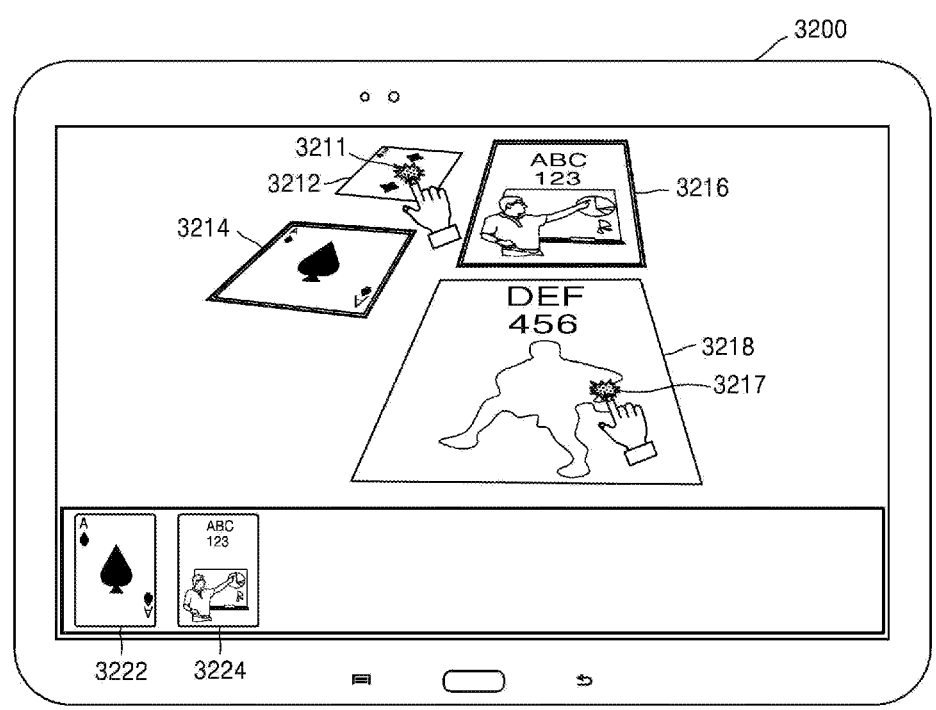
FIG. 32 is a diagram in which second image data is generated based on an external input received by a processor of an image processing apparatus and a thumbnail image of the generated second image data is displayed on a display unit, according to an exemplary embodiment.

FIG. 32 is a diagram in which second image data is generated based on an external input received by the processor 2510 of an image processing apparatus 3200 and a thumbnail image of the generated second image data is displayed on the display unit 2520, according to an exemplary embodiment. The image processing apparatus 3200 of FIG. 32 may correspond to the image processing apparatus 2500 of FIG. 25. As shown in FIG. 32, the processor 2510 may control the display unit 2520 to display first polygons 3212, 3214, 3216, and 3218 according to the descriptions provided with reference to FIGS. 26 and 27. Furthermore, the image processing apparatus 3200 may select all or some of the first polygons 3212, 3214, 3216, 3218 as second polygons, based on external inputs 3211 and 3217 that are received from the receiver 2530. In FIG. 32, first polygons 3212 and 3218 are selected as second polygons based on the external inputs 3211 and 3217. The first polygons 3212 and 3218 selected as second polygons may be displayed on the display unit 2520 differently from first polygons 3214 and 3216 that are not selected as second polygons. According to an exemplary embodiment, the processor 2510 may control the display unit 2520 so that first polygons 3212 and 3218 selected as second polygons are not displayed on the display unit 2520. The processor 2510 may extract first image data corresponding to the first polygons 3214 and 3216. That is, first image data may be extracted only with respect to the first polygons 3214 and 3216 that are not selected based on the external inputs 3211 and 3217. Furthermore, the processor 2510 may generate second image data by correcting the distortion of the extracted first image data, and may control the display unit 2520 to display thumbnail images 3222 and 3224 of the generated second image data on the display unit 2520. Referring to FIG. 32, the image processing apparatus 3200 may not display the thumbnail images 3122 and 3128 on the display unit 2520 based on the external input 3211 and 3217, when compared to FIG. 31.

Figure 33:
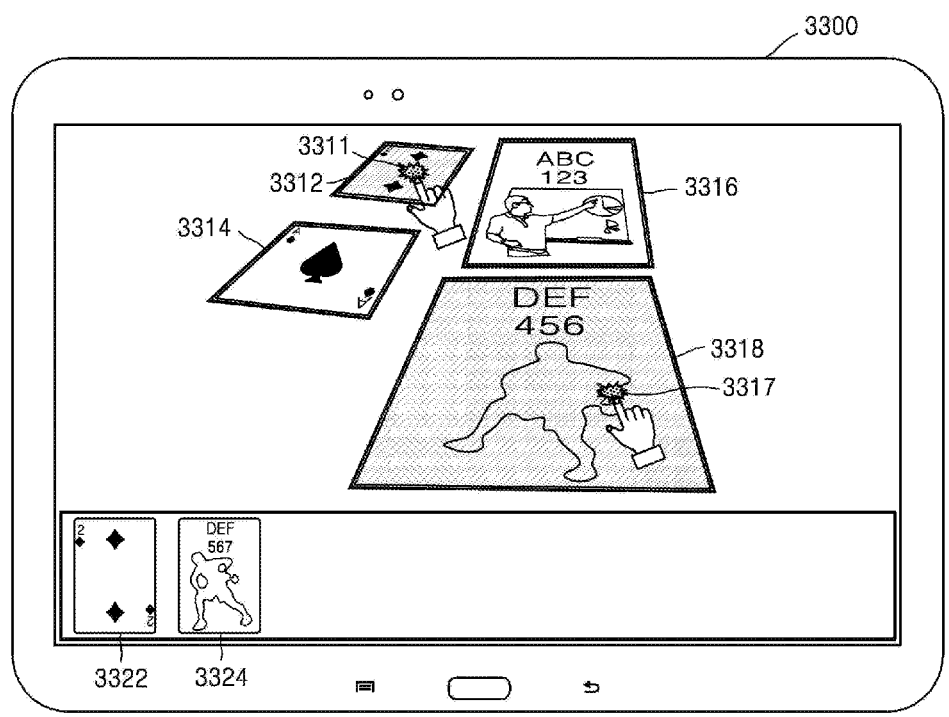
FIG. 33 is a diagram in which second image data is generated based on an external input received by a processor of an image processing apparatus and a thumbnail image of the generated second image data is displayed on a display unit, according to an exemplary embodiment.

FIG. 33 is a diagram in which second image data is generated based on an external input received by the processor 2510 of an image processing apparatus 3300 (hereafter in this discussion, "the processor") and a thumbnail image of the generated second image data is displayed on the display unit 2520, according to an exemplary embodiment. The image processing apparatus 3300 of FIG. 33 may correspond to the image processing apparatus 2500 of FIG. 25. As shown in FIG. 33, the processor may control the display unit 2520 to display first polygons 3312, 3314, 3316, and 3318 according to the descriptions provided with reference to FIGS. 26 and 28. Furthermore, the image processing apparatus 3300 may select all or some of the first polygons 3312, 3314, 3316, 3318 as second polygons, based on external inputs 3311 and 3317 that are received from the receiver 2530. Referring to FIG. 33, first polygons 3312 and 3318 are selected as second polygons based on the external inputs 3311 and 3317. The first polygons 3312 and 3318 selected as second polygons may be displayed on the display unit 2520 differently from first polygons 3314 and 3316 that are not selected as second polygons. According to an exemplary embodiment, the image processing apparatus 3300 may shade the first polygons 3312 and 3318 so that the first polygons 3312 and 3318 selected as second polygons are distinguished from the first polygons 3314 and 3316 that are not selected as second polygons. In addition, the processor 2510 of the image processing apparatus 3300 may first image data corresponding to the first polygons 3312 and 3318. Furthermore, the processor may generate second image data by correcting the distortion of the extracted first image data, and may control the display unit 2520 to display thumbnail images 3322 and 3324 of the generated second image data on the display unit 2520. Referring to FIG. 33, the image processing apparatus 3300 may not display the thumbnail images 3124 and 3126 on the display unit 2520 based on the external input 3311 and 3317, when compared to FIG. 31.

It is noted here that in some of the example screens above, such as in FIGS. 30-34, objects are displayed as though they were photographed from an offset angle (perspective type photograph). These screens, however, are merely illustrative of one display option. In other examples, objects may be displayed uniformly as though seen from a plan view.

In addition, in the above examples, a rectangular form was used as an example for the desired form of the corrected object. However, in other examples, the corrected form may be another desired polygonal form. Thus the inventive principle is not limited to the rectangular objective. Further, the polygonal form may have more or fewer than four sides.

As described above, according to the one or more of the above exemplary embodiments, a vertex of an image of a rectangular type may be formed in a region other than the boundary of the region of an object as well as in the region of the object. Thus, even though an image of an object is generally tetragonal but has an incomplete tetragonal form, the image of the object may be accurately extracted, the extracted image of the object may be converted into an image corresponding to a rectangle, and the image corresponding to the rectangle may be stored and displayed and/or transmitted.

In addition, other exemplary embodiments can also be implemented through computer readable code/instructions in/on a medium, e.g., a computer readable medium, to control at least one processing element to implement any above described exemplary embodiment. The medium can correspond to any medium/media permitting the storage and/or transmission of the computer readable code.

The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as Internet transmission media. Thus, the medium may be such a defined and measurable structure including or carrying a signal or information, such as a device carrying a bitstream according to one or more exemplary embodiments. The media may also be a distributed network, so that the computer readable code is stored/transferred and executed in a distributed fashion. Furthermore, the processing element could include a processor or a computer processor, and processing elements may be distributed and/or included in a single device.

It should be understood that the exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. An apparatus for processing an image including at least one object, the apparatus comprising:
   a processor configured to:
   detect a region of the at least one object from the image;
   define a plurality of straight lines approximating a boundary of the detected region, based on a number of distributed points at which each of the plurality of straight lines coincide with the boundary of the detected region;
   extract first image data for a polygonal region enclosed by at least some of the straight lines, and having vertexes at intersection points at which the at least some of the straight lines intersect each other and;
   generate second image data by correcting distortion of the first image data; and
   a storage unit configured to store the second image data.

2. The apparatus of claim 1, wherein:
   the at least some of the straight lines correspond to edges of the polygonal region, and the processor selects each of the at least some of the straight lines as a line having the highest number of distributed points on one side boundary of the object.

3. The apparatus of claim 1, wherein the processor sets a first region around each of the intersection points, quantizes a pixel value of image data of the first region, and corrects a first intersection point of the first region on quantized image data of the first region with respect to an outermost vertex determined based on a center of the at least one object.

4. The apparatus of claim 3, wherein the processor extracts first image data of a region corresponding to a polygon having a plurality of corrected first intersection points as vertexes and generates the second image data by correcting distortion of the extracted first image data.

5. The apparatus of claim 1, wherein the processor detects a region of each of a plurality of objects when the plurality of objects are in the image, defines a plurality of straight lines approximating a boundary of the region of each of the plurality of objects, based on a number of points at which each of the plurality of straight lines coincides with the boundary of the region of each of the plurality of objects, extracts a plurality of pieces of first image data for a polygonal region having a plurality of first intersection points, at which the plurality of straight lines intersect each other, as vertexes, and generates a plurality of pieces of second image data by correcting distortion of the plurality of pieces of first image data extracted to correspond to the region of each of the plurality of objects.

6. The apparatus of claim 5, wherein the processor generates separate files including respectively the generated plurality of pieces of second image data and stores the separate files in the storage unit.

7. The apparatus of claim 5, wherein the processor generates a single file including image data corresponding to the generated plurality of pieces of second image data and stores the single file in the storage unit.

8. The apparatus of claim 5, wherein the processor generates the second image data by extracting first image data corresponding to the largest polygonal region from among the plurality of pieces of first image data, corrects distortion of the extracted first image data and stores the second image data in the storage unit.

9. The apparatus of claim 5, wherein the processor determines types of the detected plurality of objects, generates a plurality of pieces of second image data by correcting distortion of a plurality of pieces of first image data corresponding to a plurality of objects of a same type when the determined types are the same, converts the plurality of pieces of second image data into a plurality of pieces of second image data having a same resolution, and stores the plurality of pieces of second image data having the same resolution in the storage unit.

10. The apparatus of claim 5, further comprising a display unit to display the second image data, and a receiver configured to receive an input signal,
wherein the processor selects at least one of the plurality of pieces of second image data based on the input signal received through the receiver and stores the selected at least one piece of second image data in the storage unit.

11. An apparatus for processing an image including a plurality of objects, the apparatus comprising:
a display unit;
a processor configured to detect respective regions of the plurality of objects from the image, define a plurality of straight lines approximating a boundary of each of the regions, based on a number of distributed points at which each of the plurality of straight lines coincides with the boundary of each of the regions, display a plurality of first polygons, each of which has a plurality of first intersection points, at which the plurality of straight lines intersect each other, as vertexes, on the display unit, select a second polygon that is at least one of the plurality of first polygons, and extract first image data based on the selection, and generate second image data by correcting distortion of the first image data; and
a storage unit configured to store the second image data.

12. The apparatus of claim 11, wherein the processor selects the second polygon based on at least one selected from the group consisting of a size of the plurality of first polygons, a degree of distortion, and a distance from a center of a screen, and a distance from the apparatus for processing the image to the plurality of objects, controls the display unit so that the second polygon is displayed in a different manner than first polygons other than the second polygon, which are from among the plurality of first polygons, and extracts the first image data with respect to the second polygon.

13. The apparatus of claim 11, further comprising a receiver configured to receive an external input, wherein the processor selects the second polygon based on the external input.

14. The apparatus of claim 13, wherein the processor controls the display unit so that only a third polygon corresponding to a first polygon other than the second polygon, which is from among the plurality of first polygons, is displayed, and extracts first image data for the third polygon.

15. The apparatus of claim 13, wherein the processor controls the display unit so that the second polygon is displayed in a different manner than the first polygons other than the second polygon.

16. The apparatus of claim 11, wherein the processor controls the display unit so that a thumbnail image corresponding to the second image data is displayed.

17. A method of processing an image including at least one object, the method comprising:
detecting a region of the at least one object from the image;
defining a plurality of first straight lines approximating a boundary of the detected region of the at least one object, based on a number of distributed points at which each of the plurality of first straight lines coincides with the boundary of the detected region;
extracting first image data for a polygonal region enclosed by at least some of the straight lines, and having vertexes at intersection points at which the at least some of the straight lines intersect each other;
generating second image data by correcting distortion of the first image data; and
storing the second image data.

18. The method of claim 17, wherein the at least some of the straight lines correspond to edges of the polygonal region, and each is selected as a line having the highest number of distributed points on one side boundary of the object.

19. The method of claim 17, wherein the extracting of the first image data comprises:
setting a first region around each of the intersection points;
quantizing a pixel value of image data of the first region; and
correcting a first intersection point of the first region on quantized image data of the first region with respect to an outermost vertex determined based on a center of the at least one object.

20. The method of claim 19, wherein the extracting of the first image data comprises extracting first image data of a region corresponding to a polygon having a plurality of corrected first intersection points as vertexes.

21. The method of claim 17, wherein the detecting of the region of the at least one object comprises detecting a region of each of a plurality of objects when the plurality of objects are in the image, the defining of the plurality of straight lines comprises defining a plurality of straight lines approximating a boundary of the region of each of the plurality of objects, based on a number of points at which each of the plurality of straight lines intersects the boundary of the region of each of the plurality of objects, the extracting of the first image data comprises extracting a plurality of pieces of first image data for a polygonal region having a plurality of first intersection points, at which the plurality of straight lines intersect each other, as vertexes, and the generating of the second image data comprises generating a plurality of pieces of second image data by correcting distortion of the plurality of pieces of first image data extracted to correspond to the region of each of the plurality of objects.

22. The method of claim 21, wherein the generating of the plurality of pieces of second image data comprises generating separate files including respectively the generated plurality of pieces of second image data, to store the separate files.

23. The method of claim 21, wherein the generating of the plurality of pieces of second image data comprises generating a single file including image data corresponding to the generated plurality of pieces of second image data, to store the single file.

24. The method of claim 21, wherein the generating of the plurality of pieces of second image data comprises:
generating second image data by extracting first image data corresponding to the largest polygonal region from among the plurality of pieces of first image data and correcting distortion of the extracted first image data; and
storing the second image data.

25. The method of claim 21, wherein the generating of the plurality of pieces of second image data comprises:
determining types of the detected plurality of objects;
generating a plurality of pieces of second image data by correcting distortion of a plurality of pieces of first image data corresponding to a plurality of objects of a same type when the determined types are the same;
converting the plurality of pieces of second image data into a plurality of pieces of second image data having a same resolution; and
storing the plurality of pieces of second image data having the same resolution.

26. The method of claim 21, wherein the generating of the plurality of pieces of second image data comprises:
receiving an input signal; and
storing at least one of the plurality of pieces of second image data, selected based on the received input signal.

27. A non-transitory computer readable recording medium having recorded thereon a program for executing the method of claim 17.

28. A method of processing an image including a plurality of objects, the method comprising:
detecting regions of the plurality of objects from the image;
defining a plurality of straight lines approximating a boundary of each of the regions, based on the number of distributed points at which each of the plurality of first straight lines coincides with the boundary of each of the regions;
displaying a plurality of first polygons, each of which has a plurality of first intersection points, at which the plurality of straight lines intersect each other, as vertexes;
selecting a second polygon that is at least one of the plurality of first polygons;
extracting first image data based on the selection;
generating second image data by correcting distortion of the first image data; and
storing the second image data.

29. The method of claim 28, further comprising selecting the second polygon based on at least one selected from the group consisting of a size of the plurality of first polygons, a degree of distortion, a distance from the center of a screen, and a distance from an apparatus for processing the image,
wherein the displaying of the plurality of first polygons comprises displaying the second polygon in a different manner to the first polygons other than the second polygon, and the extracting of the first image data comprises extracting the first image data with respect to the second polygon.

30. The method of claim 28, further comprising receiving an external input,
wherein the selecting of the second polygon comprises selecting the second polygon based on the external input.

31. The method of claim 30, further comprising displaying only a third polygon corresponding to a first polygon other than the second polygon, from among the plurality of first polygons,
wherein the extracting of the first image data comprises extracting first image data for the third polygon.

32. The method of claim 30, wherein the displaying of the second polygon comprises displaying the second polygon in a different manner to the first polygons other than the second polygon.

33. The method of claim 28, further comprising displaying a thumbnail image corresponding to the second image data.

* * * * *